(12) United States Patent
Takahashi

(10) Patent No.: US 6,477,616 B1
(45) Date of Patent: Nov. 5, 2002

(54) STORAGE DEVICE, STORAGE SYSTEM, MEMORY MANAGEMENT METHOD, RECORDING MEDIUM, AND COMPUTER DATA SIGNAL

(75) Inventor: Tsuyoshi Takahashi, Iwate (JP)

(73) Assignee: Tokyo Electron Device Limited, Yokohama (JP)

( * ) Notice: Subject to any disclaimer, the term of this patent is extended or adjusted under 35 U.S.C. 154(b) by 0 days.

(21) Appl. No.: 09/551,722

(22) Filed: Apr. 18, 2000

(30) Foreign Application Priority Data

Apr. 20, 1999 (JP) .......................................... 11-112222

(51) Int. Cl.$^7$ ............................................. G06F 12/00
(52) U.S. Cl. ......................... 711/111; 711/103; 711/209
(58) Field of Search ............................... 711/103, 112, 711/114, 200, 202, 209, 208, 207, 111, 104

(56) References Cited

U.S. PATENT DOCUMENTS 5,715,455 A * 2/1998 Macon et al. ............... 360/72.1
5,812,814 A * 9/1998 Sukegawa ................... 711/103
6,243,796 B1 * 6/2001 Otsuka ........................ 711/163
6,275,436 B1 * 8/2001 Tobita et al. ............ 365/189.01
6,377,500 B1 * 4/2002 Fujimoto et al. ....... 365/230.01

FOREIGN PATENT DOCUMENTS

JP          62-194555     *  8/1997
WO          WO 00/49488   *  2/1999

* cited by examiner

*Primary Examiner*—Matthew Kim
*Assistant Examiner*—Pierre-Michel Bataille
(74) *Attorney, Agent, or Firm*—Luce, Forward, Hamilton & Scripps LLP

(57) ABSTRACT

A CPU creates a file management BSI and a file management BPT in a zone 0 included in a flash memory storing directories and an FAT, and stores the created BSI and BPT in an SRAM. In response to a command from a computer to read data, the CPU specifies and reads positions of the directories and the FAT based on the file management BPT, and sends the computer with the read data. When accessing data belong to any zone other than the zone 0, the CPU creates a general BPT again, but does not update the file management BPT. Even if data which has previously been accessed belongs to any zone, the directories and the FAT can be accessed without creating the BPT again. Updating of the directories and the FAT can be also achieved without creating the BSI again.

21 Claims, 14 Drawing Sheets

US 6,477,616 B1

STORAGE DEVICE, STORAGE SYSTEM, MEMORY MANAGEMENT METHOD, RECORDING MEDIUM, AND COMPUTER DATA SIGNAL

BACKGROUND OF THE INVENTION

1. Field of the Invention

The present invention relates to a data processing system using a computer usable recording medium, and a computer readable recording medium storing a program for accessing the recording medium.

2. Description of the Related Art

A flash memory employing an EEPROM (Electrically Erasable/Programmable Read Only Memory) has been used as a recording medium to be accessed (data write/erase possible) by a computer and the like. In the flash memory, erasure of data is performed in the unit, generally so-called blocks, of the storage capacity.

Defective blocks cause unsuccessful data writing. However, it is difficult to avoid such defective blocks from appearing during manufacturing process for producing a flash memory, especially a NAND type flash memory. A conventional solution for such a problem is an address conversion table. The address conversion table represents a correspondence between at least one physical address and at least one logical address. The address conversion table is prepared by dynamically assigning successive logical addresses to normal blocks, while the physical address has been assigned to each block. Thus prepared address conversion table prevents any procedure for externally-arrived access from being complicated, resulting in addresses being successive.

In a case where the address conversion table represents a correspondence between all logical and physical addresses, size of the address conversion table is proportionate to storage capacity of the flash memory. Therefore, the large flash memory requires a large storage device for storing the enlarged table. As a result, the storage device has the complicated structure.

Zoning is a known solution to avoid the storage device from being complicated. According to this method, the plurality of block are classified into a plurality of zones. The address conversion table is prepared so as to represent the correspondence between logical and physical addresses which belong to one of the zones. If any demand for accessing the blocks in another zone is given, the table is reformed so as to include the logical and physical addresses in the zone concerned.

Since such a table reformation requires an extra process for searching all the blocks in the zone concerned, its processing time is elongated. If the flash memory is under the control of OS (Operating System), the OS usually writes FAT (File Allocation Table) or the like onto the flash memory. The FAT represents a correspondence between data managed by the OS and logical addresses thereof. An access procedure to such an extra table also requires an address conversion table. Therefore, further extra processing for preparing the address conversion table for FAT elongates the processing time further.

SUMMARY OF THE INVENTION

The present invention has been made in consideration of the above. It is an object of the present invention to provide a storage device, a storage system and a memory management method that reduce frequency for preparing address conversion tables when accessing data.

In order to achieve the above-described object, according to the first aspect of the present invention, there is provided a storage device, comprising: a memory which includes a plurality of memory blocks, each of which stores data and belongs to one of a plurality of zones and to each of which a physical address is assigned; and a controller which reads data stored in the plurality of memory blocks and externally outputs the read data, wherein the memory block belonging to a predetermined zone includes a data arrangement memory storing a data arrangement table representing a correspondence between data stored in the memory and a logical address of one memory block storing the data, and the controller includes a first table memory, includes a second table memory, creates a first address conversion table storing information representing a correspondence between the logical address and a physical address of the one memory block storing the data arrangement table, and stores the created table in the first table memory, externally acquires a logical address indicating the data arrangement table, specifies the physical address of the one memory block storing the data arrangement table based on the first address conversion table and the acquired logical address, in response to an externally-transmitted instruction, reads out the data arrangement table from the one memory block represented by the specified physical address, and externally sends the read data arrangement table, externally acquires a logical address indicating data to be read, and specifies a zone, to which a memory block represented by the logical address belongs, based on the acquired logical address, determines whether the second table memory stores a second address conversion table, which stores information representing a correspondence between the logical address and a physical address of the memory block belonging to the specified zone, and, when determined that the second table memory does not store the second address conversion table, creates the second address conversion table, and also stores the created table in the second table memory, and specifies, as a physical address indicating target data to be read, the physical address corresponding to the externally-acquired logical address, based on the second address conversion table, and reads out and outputs data stored in the memory block represented by the specified physical address.

According to this storage device, the first address conversion table, which stores the logical address of the memory block storing the data arrangement table, is kept stored in the first table memory regardless of which zone is specified. This eliminates the occurrence of the event where the stored address conversion table is updated every time the data arrangement table is accessed. Thus, lateness in the process of accessing data can be prevented.

The controller may: include an access history memory which stores the physical address, which indicates the target data to be read and which the controller itself has specified, and a logical address representing the physical address, in association with the physical address and the logical address, and specify a physical address indicating target data to be read, based on the physical address and the logical address which the access history memory stores.

According to this structure, even in the case where data including the data arrangement table is accessed, as long as accessing is preformed to the data stored in any block represented by the physical address and the logical address stored in the access history memory, there is no need to create the second address conversion table. Hence, the process of accessing data can be performed with high efficiency.

The controller may: include an empty block table memory which stores an empty block table storing information representing one or more empty blocks each of which comprises one memory block, select, of the one or more empty blocks represented by the information stored in the empty block table, a target empty block to store data, when data which is to be written and a logical address indicating the data are sent to the controller, and write the data to be written in the selected block.

The empty block tables may include: a first empty block table which stores information representing an empty block belonging to a zone including the memory block storing the data arrangement table; and a second empty block table which stores information representing one or more empty blocks belonging to one of the plurality of zones; and the controller may: determine whether the empty block memory stores the second empty block table, which stores information representing the one or more empty blocks belonging to one of the plurality of zones, and, when determined that the empty block memory does not store the second empty block table, creates the second empty block table which stores the information representing the empty blocks belonging to the specified zone, and also stores the created table in the empty block table memory; select, of the empty blocks represented by the information stored in the second empty block table, a target empty block, when data which is to be written and a logical address indicating the data are sent to the controller; write, in the empty block represented by the information stored in the first empty block table, the data arrangement table which has been updated as to represent the correspondence between the data to be written, which the controller itself has written in the empty block, and the logical address indicating the data; and update the first empty block table as not to represent that the memory block storing the updated data arrangement table is an empty block.

According to this structure, when updating the data arrangement table, even in the case where any change occurs in the memory block storing the data arrangement table, another memory block is newly assigned as one for storing the data arrangement table, using the first empty block table which is stored regardless of which zone is specified. When writing data into a memory block, a memory block is newly assigned as one for storing the data, using the second empty block table representing one or more empty blocks included in the specified zone. Thus, even if the empty block table memory has small memory capacity, the process of data writing and the process of updating the data arrangement table can be performed with high efficiency.

The storage device may store origin information in the memory block, for designating an empty block to store data next to a particular block most-recently stores data, and the empty block table may include information representing order numbers which circularly and respectively correspond to the plurality of empty blocks. In this structure, the controller may read the origin information and sequentially select one or more empty blocks including the empty block designated by the read origin information and the empty block following the one represented by the read origin information, when data to be written and a logical address indicating the data are sent to the controller.

By doing this, the process of writing data into empty blocks is cyclically performed one after another. This eliminates the possibility that data is frequently updated only in certain memory blocks. Hence, it is preventable that only some of the memory blocks are deteriorated in its performance, in the case such memory blocks are to be deteriorated upon frequent writing of data thereinto.

The origin information may temporarily be stored in a certain section of an empty block which is to store data next to the particular block which most-recently stores data. In this case, the controller may erase the origin information stored in the block storing the data which is to be written, and write the origin information in the certain section of the empty block which corresponds to an order number next to one corresponding to the block most-recently storing data.

Each of the plurality of memory blocks may comprise a data area and a redundant bit area. In this structure, the origin information may be stored in the redundant bit area of the empty block which is to store data next to the empty block which most-recently stores data.

According to the second aspect of the present invention, there is provided a storage system comprising: a memory which includes a plurality of memory blocks, each of which stores data and belongs to one of a plurality of zones and to each of which a physical address is assigned; a controller which reads out and outputs data stored in the plurality of memory blocks; and an access device which acquires the data which the controller outputs, and wherein the memory block belonging to a predetermined zone includes a data arrangement memory storing a data arrangement table representing a correspondence between data stored in the memory and a logical address of one memory block storing the data, the controller includes a first table memory, includes a second table memory, and creates a first address conversion table, which stores information representing the logical address and a physical address of the one memory block storing the data arrangement table, and stores the created first address conversion table in the first table memory, said access device provides the controller with a logical address indicating the data arrangement table, said controller specifies the physical address of the one memory block storing the data arrangement table, based on the first address conversion table and the provided logical address indicating the data arrangement table, reads out the data arrangement table from the one memory block indicated by the specified physical address, and outputs the read data arrangement table, the access device specifies a logical address indicating data to be read, based on the data arrangement table which the controller has read out, and the controller specifies a zone to which a memory block indicated by the logical address belongs, based on the logical address which the access device specified, determines whether the second table memory stores a second address conversion table storing information representing a correspondence between the logical address and a physical address of the memory block belonging to the specified zone, creates the second address conversion table when determined that the second table memory does not store the second address conversion table, and stores the created second address conversion table in the second table memory, and specifies, as a physical address indicating data to be read, the physical address corresponding to the logical address which the access device has specified, based on the second address conversion table, reads out and outputs data stored in one memory block represented by the specified physical address.

According to such a storage system, the first address conversion table, which represents the logical address of the block storing the data arrangement table, is kept stored regardless of which zone is specified. Thus, the stored address conversion table is prevented from being updated every time the data arrangement table is accessed. Hence, lateness in the process of accessing data is preventable.

The controller may include an access history memory which stores the physical address, which indicates the data to be read and which the controller has specified, and a logical address representing the physical address, in association with the physical address and the logical address, and specifies a physical address indicating data to be read, based on the logical address and the physical address stored in the access history memory.

According to this structure, even if data stored in any table other than the data arrangement table is to be accessed, as long as accessing is performed to data stored in a block represented by the logical address and the physical address stored in the access history memory, there is no need to create the second address conversion table. Thus, the process of accessing data is effectively performed.

The access device may supply the controller with data to be written and a logical address indicating the data to be written, and the controller may include an empty block table memory storing an empty block table, which stores information representing one or more empty blocks each of which comprises one memory block, select, a target empty block, of the one or more memory blocks represented by the information stored in the empty block table, when data which is to be written and a logical address indicating the data are sent to the controller, and write the data to be written in the selected block.

The empty block tables may include a first empty block table, which stores information representing an empty block belonging to a certain zone including the memory block storing the data arrangement table, and a second empty block table, which stores information representing an empty block belonging to one of the zones. In this case, the controller may determine whether the empty block table memory stores the second empty block table storing information representing an empty block belonging to the specified zone, and creates the second empty block table which stores the information representing the empty blocks belong to the specified zone, and stores the created second empty block table in the empty block table memory when determined that the empty block table memory does not store the second empty block table, select an empty block to store data, of the empty blocks represented by the information stored in the second empty block table, when data which is to be written and a logical address indicating the data are sent to the controller, write, in the empty block represented by the information stored in the first empty block table, the data arrangement table which has been updated as to represent the correspondence between the data, which the controller itself has written in the empty block, and a logical address indicating the data to be written, and update the first empty block table as not to represent that the memory block storing the updated data arrangement table is an empty block.

According to this structure, when updating the data arrangement table, in the case where any change occurs in the memory block storing the data arrangement table, another memory block is newly assigned as one for storing the data arrangement table, using the first empty block table which is stored regardless of which zone is specified. When writing data into a memory block, a memory block is newly assigned as one for storing the data, using the second empty block table representing one or more empty blocks included in the specified zone. Thus, even if the empty block table memory has small memory capacity, the process of data writing and the process of updating the data arrangement table can be performed with high efficiency.

The storage system may store origin information in the memory block, for designating an empty block to store data next to an empty block most-recently stores data, and the empty block table may include information representing order numbers which circularly and respectively correspond to the empty blocks. In such a case, the controller may read the origin information and sequentially select one or more empty blocks including the empty block designated by the read origin information and the empty block following the one represented by the read origin information, when data to be written and a logical address indicating the data are sent to the controller.

By doing this, the process of writing data into empty blocks is cyclically performed one after another. This eliminates the possibility that data is frequently updated only in certain memory blocks. Hence, it is preventable that only some of the memory blocks are deteriorated in its performance, in the case such memory blocks are to be deteriorated upon frequent writing of data thereinto.

The origin information may be stored in a certain section of an empty block which is to store data next to the memory block which most-recently stores data. In this case, the controller may erase the origin information stored in the block storing the data which is to be written, and write the origin information in the certain section of the empty block which corresponds to an order number next to one corresponding to the block which most-recently stores data.

Each of the plurality of memory blocks may comprise a data area and a redundant bit area. In this case, the origin information may be stored in the redundant bit area of the empty block which is to store data next to the empty block most-recently stores data.

According to the third aspect of the present invention, there is provided a memory management method for managing reading of data from a memory, including a plurality of memory blocks, each of which stores data and belongs to one of a plurality of zones and to each of which a physical address is assigned, and wherein the memory block belonging to a predetermined zone is to store a data arrangement table representing a correspondence between the data and a logical address of the memory block storing the data, the method comprising the steps of: creating and storing a first address conversion table storing information representing a correspondence between the logical address and a physical address of the memory block storing the data arrangement table; externally acquiring a logical address indicating the data arrangement table, and specifying the physical address of the memory block storing the data arrangement table, based on the first address conversion table and the acquired logical address, in response to an externally-sent instruction, reading the data arrangement table from the memory block which the specified physical address represents, and externally sending the read data arrangement table; externally acquiring a logical address indicating data to be read, and specifying zone to which a memory block, represented by the acquired logical address, belongs based on the acquired logical address; determining whether a second address conversion table, which stores information representing a correspondence between the logical address and a physical address of the memory block belonging to the specified zone, is created, and creating and storing the second address conversion table when determined that the second address conversion table is not created; and specifying, as a physical address indicating data to be read, the physical address to the externally-acquired physical address, reading and outputting data stored in the memory block represented by the specified physical address.

According to the memory management method, the first address conversion table representing the logical address of the block storing the data arrangement table is kept stored regardless of which zone is specified. This eliminates the occurrence of the event where the stored address conversion table is updated every time the data arrangement table is accessed. Thus, lateness in the process of accessing data can be prevented.

According to the fourth aspect of the present invention, there is provided a memory management method for managing reading of data from a memory, including a plurality of memory blocks, each of which stores data and belongs to one of a plurality of zones and to each of which a physical address is assigned, and wherein the memory block belonging to a predetermined zone is to store a data arrangement table representing a correspondence between the data and a logical address of a memory block storing the data, the method comprising the steps of: creating and storing a first address conversion table storing information representing a correspondence between the logical address and a physical address of the memory block storing the data arrangement table; externally acquiring a logical address indicating the data arrangement table, and specifying a physical address of a memory block storing the data arrangement table based on the first address conversion table and the acquired logical address, in response to an externally-acquired instruction, and reading the data arrangement table from the memory block which the specified physical address represents; specifying a logical address indicating the data to be read, based on the data arrangement table; specifying a zone to which a memory represented by the logical address belongs, based on the specified logical address; determining whether a second address conversion table, which stores information representing a correspondence between the logical address and a physical address of the memory block belonging to the specified zone, is created, and creating the second address conversion table when determined that the second address conversion table is not created; and specifying, as a physical address indicating data to be read, the physical address corresponding to the specified logical address, based on the second address conversion table, reading and outputting data stored in the memory block represented by the specified physical address.

According to such a memory management method, the first address conversion table, which stores the logical address of the memory block storing the data arrangement table, is kept stored regardless of which zone is specified. This eliminates the occurrence of the event where re the stored address conversion table is updated every time the data arrangement table is accessed. Thus, lateness in the process of accessing data can be prevented.

According to the fifth aspect of the present invention, there is provided a computer readable recording medium which stores programs for making a computer function as a controller, which is connected to memory including a plurality of memory blocks, each of which stores data and belongs to on e of a plurality of zones and to each of which a physical address is assigned, and wherein the memory block belonging to a predetermined zone is to store a data arrangement table, which represents a correspondence between the data and a logical address representing a physical address of a memory block storing the data, and wherein the computer: includes a first table memory and a second table memory; creates a first address conversion table, which stores information representing a correspondence between the logical address and a physical address of the memory block storing the data arrangement table, and stores the created first address conversion table in the first table memory; externally acquires a logical address indicating the data arrangement table, and specifies the physical address of the memory block storing the data arrangement table, based on the first address conversion table and the acquired logical address, in response to an externally-sent instruction, reads the data arrangement table from the memory block which the specified physical address represents, and externally sends the read data arrangement table; externally acquires a logical address indicating data to be read, and specifies a zone to which a memory block represented by the logical address belongs, based on the acquired logical address; determines whether the second table memory stores a second address conversion table storing information representing a correspondence between the logical address and a physical address of the memory block belonging to the specified zone, and creates the second address conversion table when determined that the second table memory does not store the second address conversion table, and also stores the created second address conversion table in the second table memory; and specifies, as a physical address indicating data to be read, the physical address corresponding to the externally-acquired logical address, based n the second address conversion table, and reads out and output data stored in a memory block which the specified physical address represents.

According to the computer executing the programs stored on the recording medium, the first address conversion table representing the logical address of the memory block storing the data arrangement table is kept stored regardless of which zone is specified. This eliminates the occurrence of the event where the stored address conversion table is updated every time the data arrangement table is accessed. Thus, lateness in the process of accessing data can be prevented.

According to the sixth aspect of the present invention, there is provided a computer data signal embodied in a carrier wave and representing a program for making a computer function as a controller, which is connected to a memory including a plurality of memory blocks, each of which stores data and belongs to one of a plurality of zones and to each of which a physical address is assigned, and wherein the memory block belonging to a predetermined zone stores a data arrangement table, representing a correspondence between the data and a logical address representing a physical address of a memory block storing the data, and wherein the computer: includes a first table memory and a second table memory; creates a first address conversion table, which stores information representing a correspondence between the logical address and a physical address of the memory block storing the data arrangement table, and stores the created first address conversion table in the first table memory; externally acquires a logical address indicating the data arrangement table, and specifies a physical address of the memory block storing the data arrangement table based on the first address conversion table and the acquired logical address, in response to an externally-sent instruction, reads out the data arrangement table from the memory block represented by the specified physical address, and externally sends the read data arrangement table; externally acquires a logical address indicating data to be read, and specifies a zone to which a memory block represented by the logical address belongs, based on the acquired logical address; determines whether the second table memory stores a second address conversion table storing information representing a correspondence between the logical address and a physical address of the memory block belonging to the specified zone, and creates the second address conversion table when determined that the second table memory does not store the second address conversion table, and also stores the created second address conversion table in the second table memory; and specifies, as a physical address indicating data to be read, the physical address corresponding to the externally-acquired logical address, based on the second address conversion table, and reads and output data stored in the memory block which the specified physical address represents.

According to such a computer executing the program represented by the computer data signal, the first address conversion table, which stores the logical address of the memory block storing the data arrangement table, is kept stored regardless of which zone is specified. This eliminates the occurrence of the event where the stored address conversion table is updated every time the data arrangement table is accessed. Thus, any lateness in the process of accessing data can be prevented.

According to the seventh aspect of the present invention, there is provided a storage device comprising: storage means having a plurality of memory blocks, each of which stores data and belongs to one of a plurality of zones and to each of which a physical block address is assigned; and reading means for reading out data stored in the plurality of memory blocks and externally outputs the read data, wherein the memory block belonging to a predetermined zone further comprising data arrangement memory storing means for storing a data arrangement table representing a correspondence between data stored in said memory and a logical address of one memory block storing the data, and wherein said reading means further comprising; first table storing means for creating a first address conversion table, which stores information representing the logical address and a physical address of the one memory block storing the data arrangement table, and storing the created table, data arrangement table searching means for externally acquiring a logical address indicating the data arrangement table, and specifying the physical address of the one memory block storing the data arrangement table based on said first address conversion table and the acquired logical address, in response to an externally-transmitted instruction, and reading out the data arrangement table from the one memory block represented by the specified physical address, and also externally sending the read data arrangement table, zone specifying means for externally acquiring a logical address indicating data to be read, and specifying one of the plurality of zones, to which a memory block represented by the logical address belongs, based on the acquired logical address, second table storing means for determining whether said second table memory stores a second address conversion table, which stores information representing a correspondence between the logical address and a physical address of the memory block belonging to the specified zone, and when determined that said second table memory does not store the second address conversion table, creating the second address conversion table, and also storing the created table, and data searching means for specifying, as a physical address indicating data to be read, the physical address corresponding to the externally-acquired logical address, based on the second address conversion table, and reading out and output data stored in the memory block which the specified physical address represents.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

An embodiment of the present invention exemplifying a storage system employing a flash memory will now be described with reference to the accompanying drawings.

Figure 1:
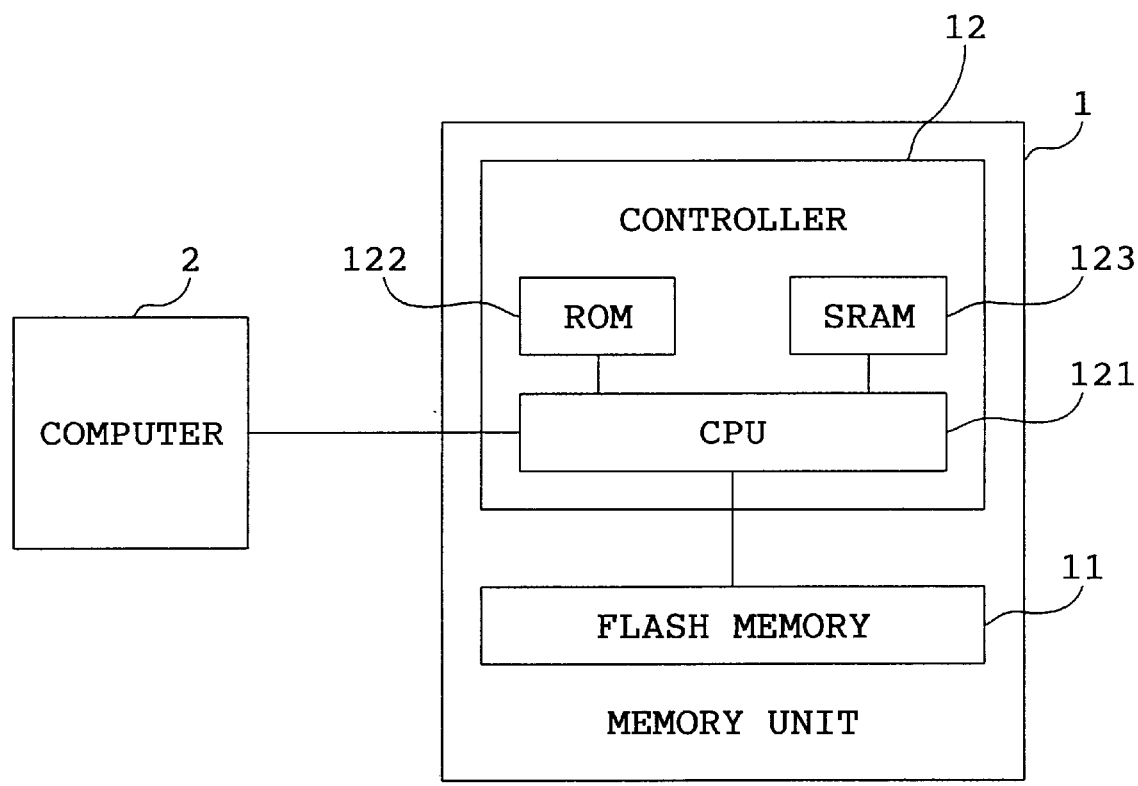
FIG. 1 is a block diagram showing the structure of a storage system according to an embodiment of the present invention.

FIG. 1 is a block diagram showing the physical structure of the storage system according to one embodiment of the present invention.

As shown in FIG. 1, the storage system comprises a memory unit 1 and a computer 2. The memory unit 1 is detachably attached to a slot of the computer 2.

The slot on the computer 2 may be a PCMCIA(Personal Computer Memory Card International Association) slot for interconnecting PCMCIA buses.

The memory unit 1 comprises a flash memory 11 and a controller 12 connected to the flash memory 11 via a bus.

The flash memory 11 is a storage device such as an EEPROM (Electrically Erasable/Programmable Read Only Memory).

The flash memory 11 stores data sets supplied from the computer 2 in response to an access by the controller 12. On the contrary, the flash memory 11 supplies the computer 2 with requested data sets stored therein in response to the access by the controller 12. Moreover, the flash memory 11 erases the requested data sets in response to the access by the controller 12.

Figure 2:
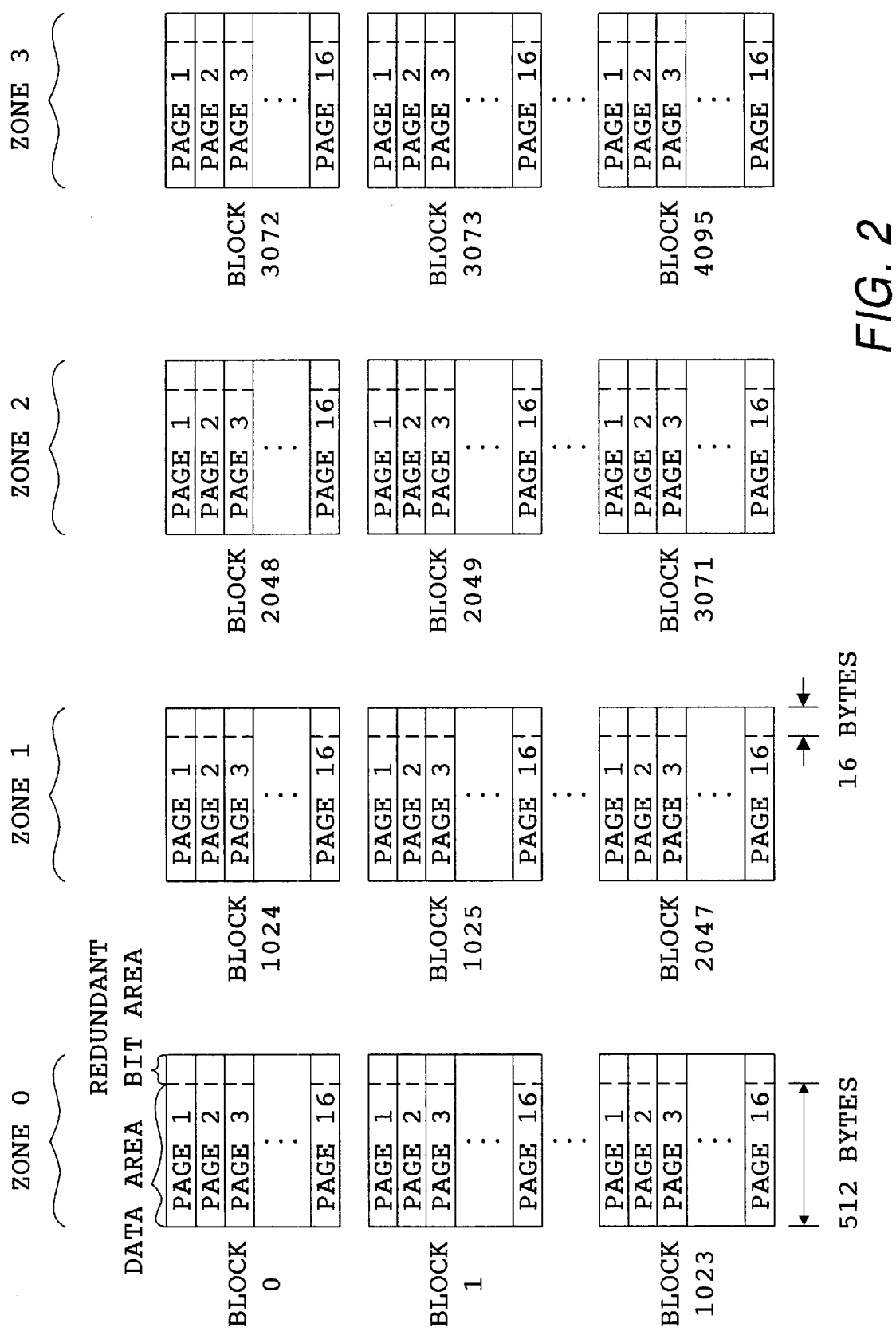
FIG. 2 is a diagram schematically showing the logical structure of memory areas in a flash memory.

The flash memory 11 has, for example, 65,536 pages of a memory area as shown in FIG. 2. Storage capacity of each page is 528 byte. Each page has memory cells to which successive addresses 0 to 527 are assigned.

As shown in FIG. 2, each page is divided into two areas, a data area and a redundant bit area. The data area is a 512-byte area including the page head while the redundant bit area is a 16-byte area including the page end.

The data area is an area for the data set to be sent to/from the computer 2. The redundant bit area is an area for additional data such as an error check code for checking whether the data set in the data area is destroyed or not.

A unit of 16 pages forms 1 block. Capacity of the block is 8KB. The number of blocks in the memory area is 4,096.

Successive physical addresses 0 to 4,096 are respectively assigned to the blocks. The pages in each block have successive page addresses from 0 to 15.

A value representing a logical block address assigned to each block is stored in the redundant bit area of the pages in the block concerned.

The logical block address is a unit to be referred to by the controller 12 when writing/reading the data (described later). In other words, the controller 12 recognizes the logical block address as the unit for data writing/reading.

The total number of the blocks to which the logical block addresses are assigned is set so as to be smaller than the total number of the physical blocks in the flash memory 11. For example, the logical block addresses are assigned to 4,000 blocks.

The blocks in the flash memory 11 are further classified into a plurality of zones. A unit of 1,024 blocks to which the block addresses 0 to 1,023 are assigned forms a first zone (zone 0). In the same manner, a unit of another 1,024 blocks of block address 1,024 to 2,047 forms a second zone (zone 1). A third zone (zone 2) includes another set of 1,024 blocks of block address 2,048 to 3,071, and a fourth zone (zone 3) includes the rest of 1,024 blocks. Zone addresses 0, 1, 2 and 3 are given to the zones 0 to 3 respectively. (In this specification and accompanying drawings, numbers will be given in hexadecimal if terminated by "h").

A range of the logical block addresses to be assigned to the blocks in each zone is previously determined by the program to be executed by a CPU 121 in the controller 12.

For example, the logical block addresses to be addressed to the blocks in the zones 0, 1, 2 and 3 are determined to be in a corresponding one of ranges respectively from 0000h to 03E7h, 03E8h to 07CFh, 07D1h to 0BB7h, and 0BB8h to 0F9Fh.

When the controller 12 requests the flash memory 11 to erase data sets in a specific block, contents in all memory cells included in the block concerned are reset. In a case where, for example, the flash memory 11 is of a NAND type, a value in each memory cell corresponding to the requested block is reset to "1".

Directories and FAT (File Allocation Table) are formed in the memory area of the flash memory 11 by later-described processing.

The directories and the FAT are prepared in 256 blocks which belong to the zone 0. First 256 addresses (that is, in the range from 0000h and 00FFh) are given as the logical block addresses to the blocks concerned.

Figure 3:
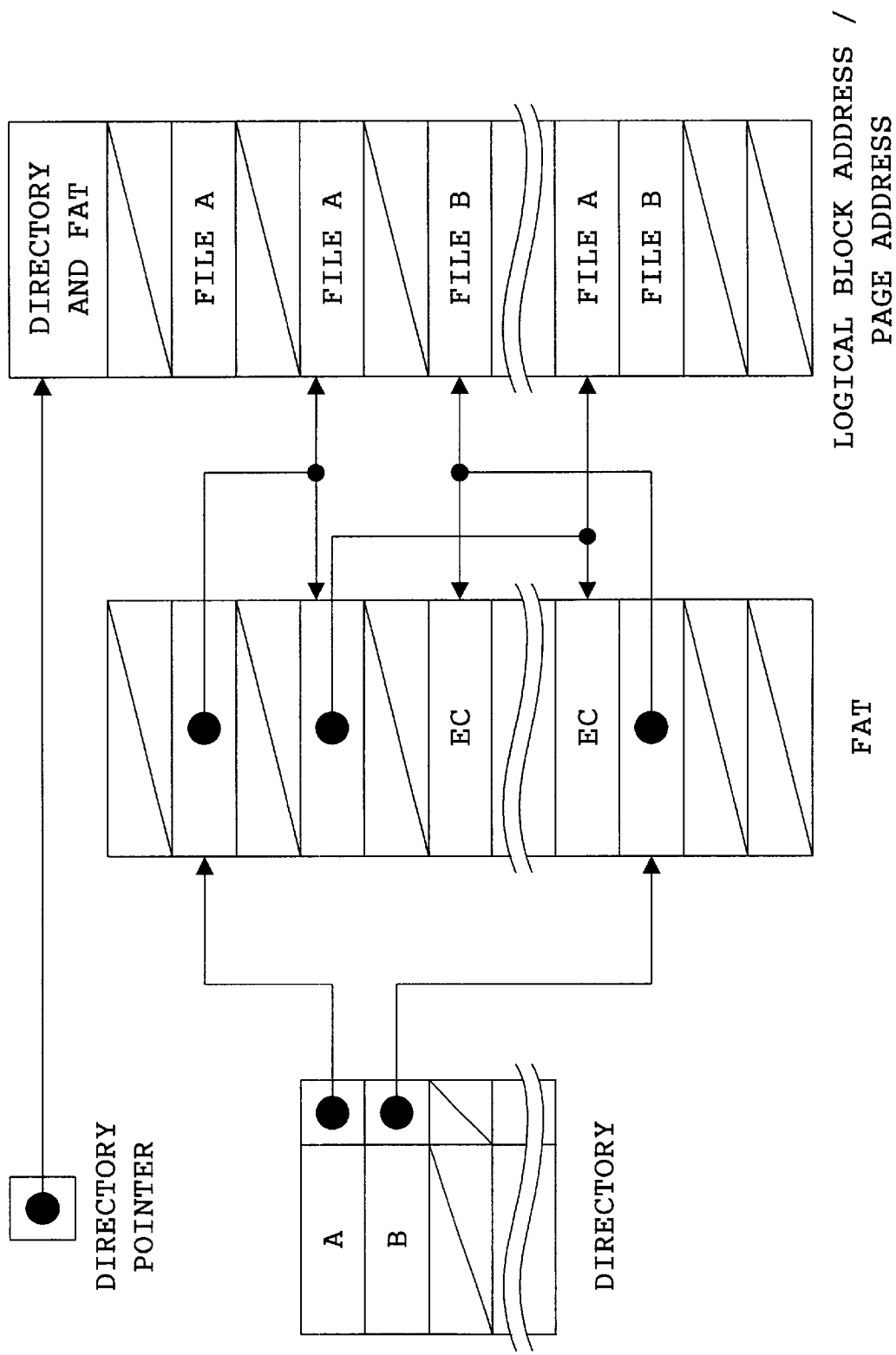
FIG. 3 is a diagram schematically showing the structures of directories and the data structure in an FAT.

FIG. 3 is a diagram showing a correspondence among the directories, the FAT, and the logical block address. As shown in FIG. 3, the logical block address of the block in which the directories and FAT are stored is indicated by, for example, a directory pointer under the control of the CPU 121.

The directory is a table including file names of files in the flash memory 11, and logical block address and page address corresponding to start bits of the files. It should be noted here that a file means a bunch of data sets to be designated by the computer 2 as a unit for handling.

The FAT is a table indicating the file arrangement in the memory area of the flash memory 11. When a file is too large to be written into a single page, only a certain portion of the file is written therein. At that time, as shown in FIG. 3, the FAT indicates a logical block address assigned to a block including a page for storing the remaining portion of the file, and a page address assigned to the page, in association with each other.

As shown in FIG. 3, attached to the page address, which has been affixed to the page for storing the end portion of the file, is an end code (EC). By doing this, the page can be identified as for storing the end portion of the file.

The controller 12, as shown in FIG. 1, comprises the CPU (Central Processing Unit) 121, a ROM (Read Only Memory) 122 and an SRAM (Static Random Access Memory) 123.

The CPU 121 is connected to the ROM 122, the SRAM 123 and the flash memory 11 via an internal bus. The CPU 121 is detachably connected to a PCMCIA slot included in the computer 2.

The CPU 121 executes a process, as will be explained later, in accordance with processing of a program which is stored in the ROM 122. This program is pre-stored in the ROM 122 by the manufacturer of the controller 12, for example.

Upon reception of an instruction sent from the computer 2 for constituting an access device, the CPU 121 carries out the instruction. Those instructions to be carried out by the CPU 121 include the one to access the flash memory 11.

The SRAM 123 serves as a working area of the CPU 121. The SRAM 123 includes a save memory area, and stores a BSI (Block Search Index) and a BPT (Block Pointer Table) which are created by a process, as will be explained later.

The save memory area is a memory area for temporarily storing the data stored in a block including a target page for storing the data.

The BSI is composed of a file management BSI and a general BSI.

The file management BSI stores information identifying, of blocks which belong to the zone 0 of the memory area included in the flash memory 11, any empty blocks (i.e., any blocks being in the state of reset).

The general BSI stores information identifying, of blocks which belong to one of the zones of the memory area included in the flash memory 11, any empty blocks.

The file management BSI and the general BSI are both created and updated in accordance with a later-described process, to be performed by the controller 12, and are stored in the SRAM 123.

The CPU 121 creates zone information in accordance with a later-described process, and stores the created zone information in the SRAM 123. The created zone information is information representing which zone of empty blocks the general BSI specifies.

Figure 4:
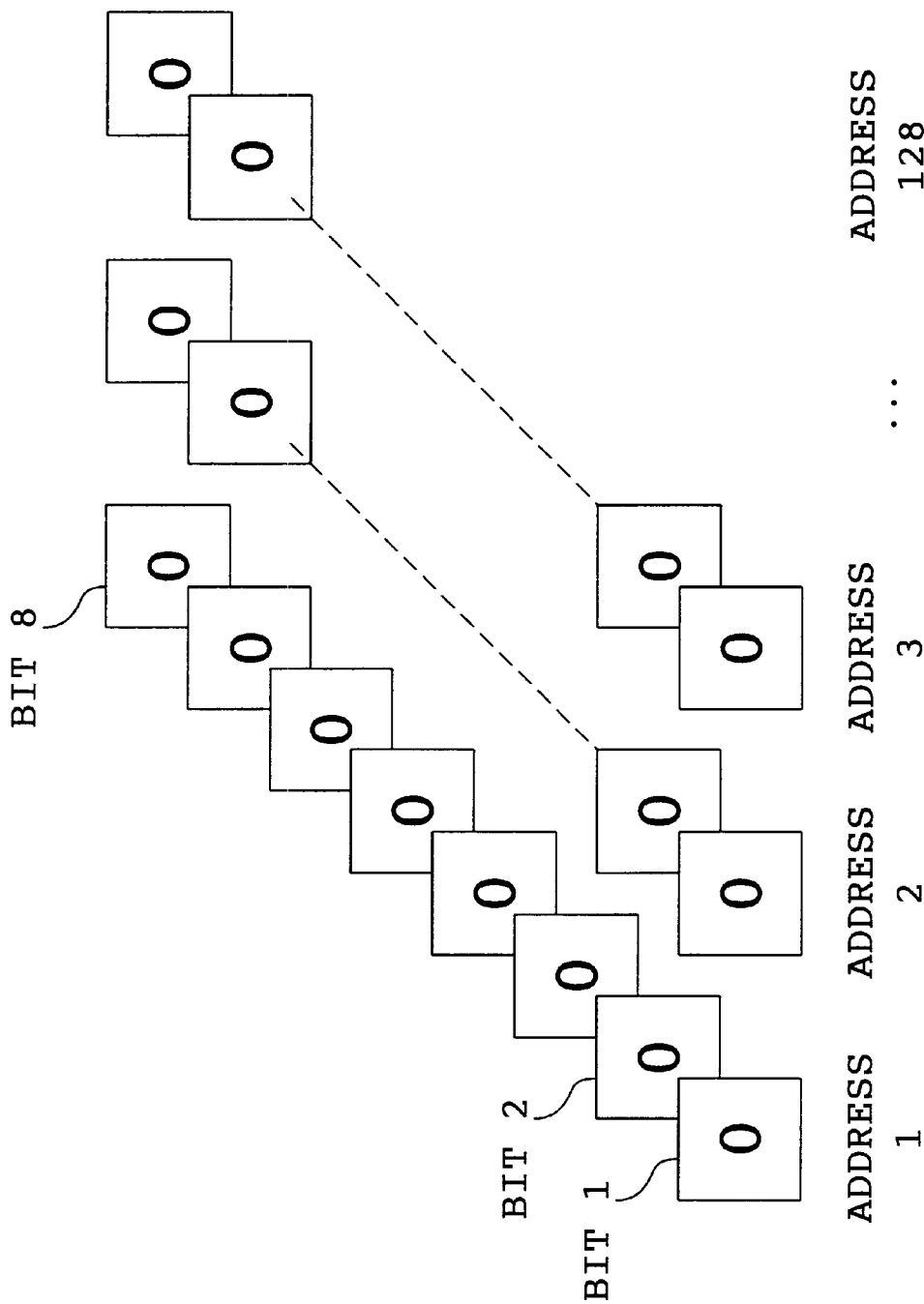
FIG. 4 is a diagram schematically showing the data structure of a general BSI and a file management BSI.

Exemplified in FIG. 4 is the structure of the general BSI, when each zone in the flash memory 11 includes a set of 1,024 blocks. The data structure of the file management BSI is substantially the same as that of the general BSI. As shown in FIG. 4, a single general BSI is constituted by 128 bytes of data items. Each bit of the general BSI, sequentially from the start bit of the first byte, is in one-to-one correspondence with the 1,024th block from the head block within a particular zone which the zone information represents. At this time, each of the bits stores "1" or "0" respectively when its corresponding block is an empty block or not.

The BPT includes a file management BPT and a general BPT.

The file management BPT stores information showing a correspondence between logical block addresses and physical block addresses included in each block which stores the directories and the FAT.

The general BPT stores information representing a correspondence between logical block addresses and physical block addresses included in each block which belongs to the same zone (i.e., the one which the zone information stored in the SRAM 123 represents) as the zone including the empty block(s) which the BSI identifies. In the case where the general BPT represents a correspondence between logical block addresses and physical block addresses included in a block which belongs to the zone 0, a correspondence between the logical block addresses and the physical block addresses of each block storing the directories and the FAT, is represented by both of the file management BPT and the general BPT.

The file management BPT and the general BPT are both created and updated in accordance with a later-described process to be carried out by the CPU 121, and are stored in the SRAM 123.

Each of the file management BPT and the general BPT is in a predetermined logical position within the memory area of the SRAM 123. Each of the file management BPT and the general BPT includes a plurality of memory areas for storing physical block addresses respectively corresponding to logical block addresses.

Figure 5:
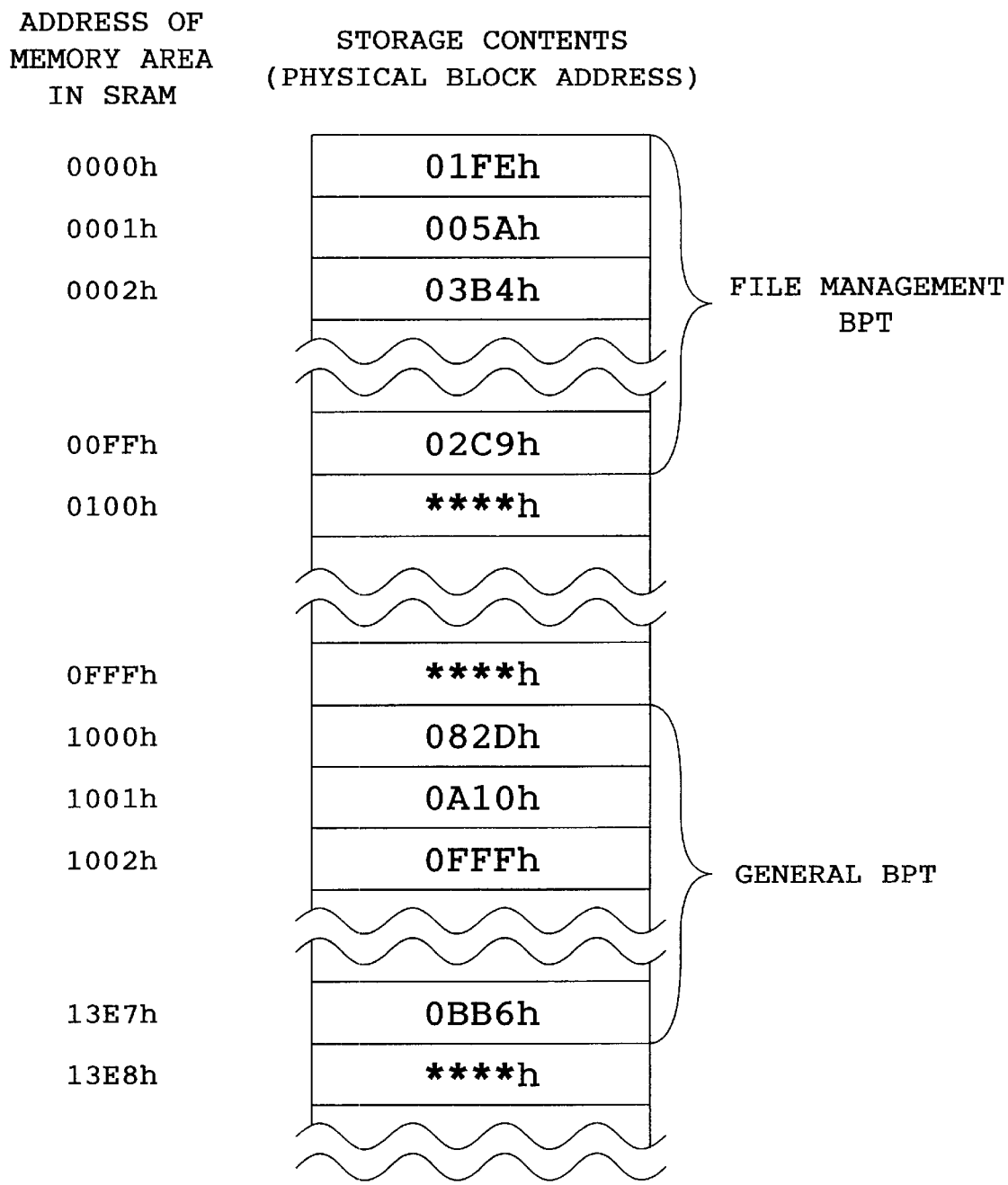
FIG. 5 is a diagram schematically showing the data structure of a BPT.

The file management BPT and the general BPT respectively have the data structures specifically shown in FIG. 5.

As illustrated in FIG. 5, the file management BPT includes memory areas of 256 words, for example. The first addresses of 0000h to 00FFh are respectively assigned to the first 256 words. In the case where the total number of logical block addresses, representing those blocks each belonging to one of the zones, is 1,000, the general BPT includes memory areas of 1,000 words. In such a case, the addresses of 1000h to 13E7h are respectively assigned to the first 1,000 words.

Each address affixed to each memory area forming the file management BPT is the logical block address. The storage contents stored in each memory area corresponding to one word, to which a corresponding address is affixed, represent a physical block address of the block corresponding to the logical block address which the address represents.

On the contrary, each address affixed to each of the memory areas constituting the general BPT is equal to a given value. This value can be obtained such that a value of the zone, which is represented by the above-described zone information and which is multiplied by 03E8h (i.e., 1,000 in hexadecimal), is subtracted from the sum of the corresponding logical block address and an offset value. The offset value in this case is the minimum value among the addresses affixed to the memory areas constituting the general BPT.

The storage contents stored in one memory area corresponding to one word, to which a corresponding address is affixed, represent a physical block address of a block corresponding to a logical block address which the affixed address represents.

In particular, as shown in FIG. 5, the memory area, to which an address 1001h is affixed and whose offset value is also 1000h, stores a value "0A10h". In addition, the zone information represents the zone 2 in association with this memory area. In this case, a logical block address "07D1h" is affixed to a block whose a physical block address is "0A10h".

If the storage contents stored in a memory area, to which a corresponding address is affixed, represents a predetermined value (e.g., the value "0FFFh" as shown in FIG. 5), no physical block address corresponds to the logical block address represented by the address of the memory area storing the above value.

The computer 2 includes a personal computer, or the like. The computer 2 has a PCMCIA slot, stores program data representing an OS and a driver, and executes the OS. The computer 2 activates the driver in accordance with the processing of the OS, upon detection of installation of the memory unit 1 in the PCMCIA slot.

The computer 2, which performs the processing of the driver, makes the CPU 121 access the flash memory 11. Particularly, the computer 2 supplies the controller 12 with the above-described instruction and data to be written in the flash memory 11. The CPU 121 reads out data from the flash memory 11 in accordance with the received instruction and supplies the computer 2 with the read data.

(Operations)

Operations of the storage system will now be explained with reference to FIGS. 6 to 11.

Figure 6:
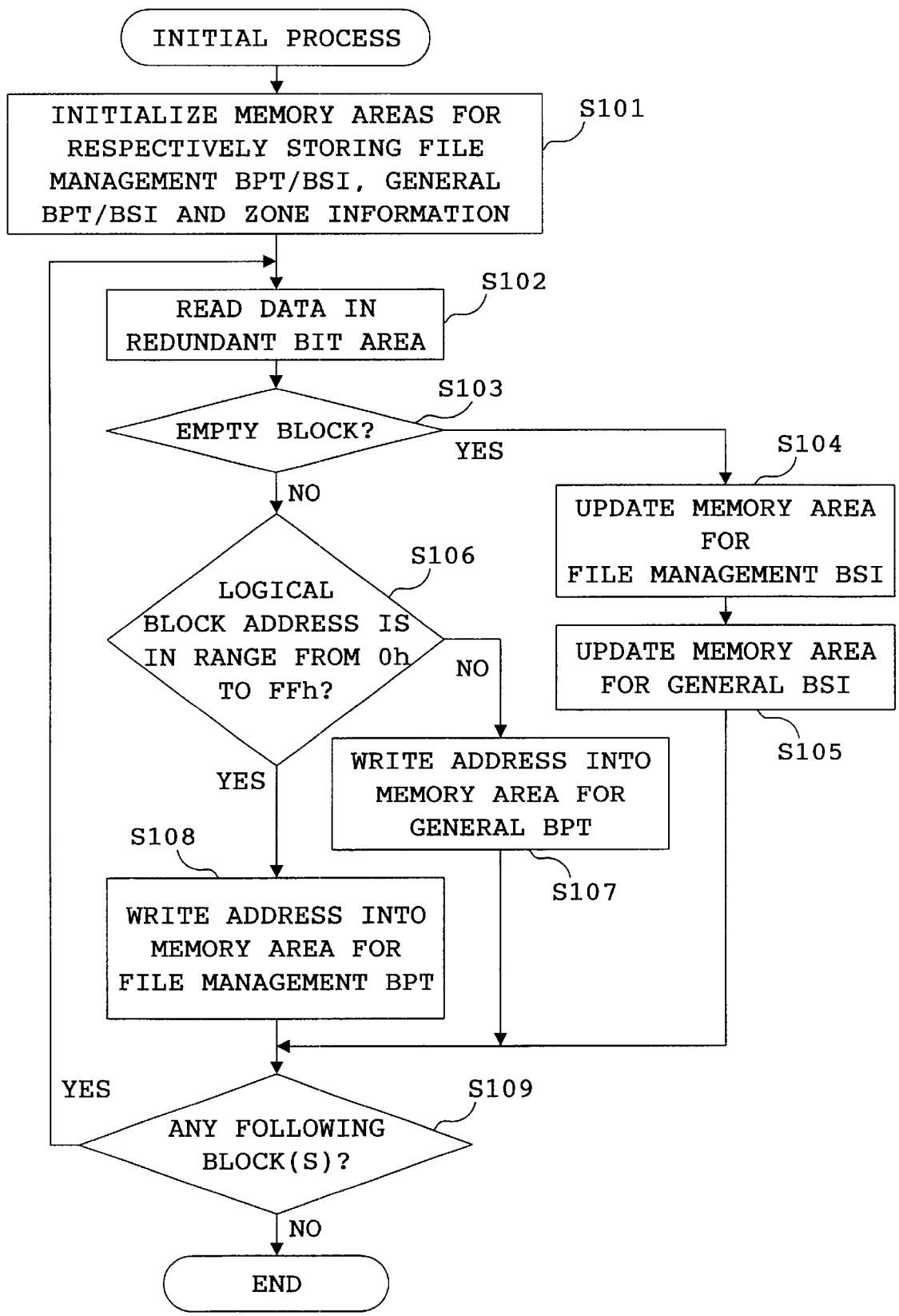
FIG. 6 is a flowchart showing steps of an initial process.

(Initial Process, FIG. 6)

Once the storage system is activated, the CPU 121 included in the controller 12 of the memory unit 1 carries out the steps of the initial process shown in FIG. 6.

When the initial process begins, the CPU 121 initializes, of the memory areas of the SRAM 123, a memory area for storing the BPT an d a memory area for storing the BSI (Step S101).

In particular, in Step S101, the CPU 121 writes a predetermined value (e.g., the above value "0FFFh"), representing that no physical block address is assigned to each memory area which is represented by an address of its corresponding word, to a memory area for storing the file management BPT and a memory area for storing the general BPT, of the memory areas of the SRAM 123. The CPU 121 sets to "0" each logical value of bits of the memory area for storing the file management BSI and of the memory area for storing the general BSI. The CPU 121 stores zone information representing the zone 0, in a memory area for storing the zone information.

Then, the CPU 121 specifies, of blocks belonging to the zone 0 in the flash memory 11, one block, having a redundant bit area, which stores data having not yet been read, and being assigned the lowest physical block address. Thereafter, the CPU 121 reads the data stored in the redundant bit area of a page belonging to the specified block (Step S102).

The CPU 121 determines whether the block, which is specified and from which data is read in Step S102, is an empty block on the basis of the data read in Step S102 (Step S103). In more particular, the CPU 121 determines whether any empty block code in a predetermined form is affixed to the data read in Step S102. When the CPU 121 determines that the block is not an empty block, as a result of the determination that no empty block code is affixed to the data, the flow advances to Step S106.

When the CPU 121 determines that the block is an empty block, as a result of the determination that an empty block code is affixed to the data, it refers to a physical block address representing the empty block, and calculates bit positions of the physical block address in the memory area for storing the file management BSI within the memory area of the SRAM 123. The CPU 121 updates a logical value of any bit whose position is calculated (Step S105), and sets the value to "1". Upon completion of the procedures of Steps S104 and S105, the flow advances to Step S109.

In Step S106, the CPU 121 determines whether the data read in Step S102 includes one of logical block addresses which correspond to the first 256 memory areas of the SRAM 123. That is, it is determined whether such data includes one of logical block addresses which is equal to a value in a range from "0000h" to "00FFh".

When determined that the data does not include any one of the above range of addresses, the CPU 121 writes a physical block address of a block whose logical block address has been read, to a memory area of the SRAM 123 to which an address corresponding to a logical block address read out from the flash memory 11 is affixed and which stores the general BPT (Step S107), and the flow advances to Step S109. In doing so, new information, which represents a correspondence between the physical block address and the logical block address, is added to the general BPT.

When determined the data includes any one of the above range of addresses, the CPU 121 writes a physical block address of a block whose logical block address has been read, to a memory area of the SRAM 123 to which an address corresponding to a logical block address read out from the flash memory 11 is affixed and which stores the file management BPT (Step S108), and the flow advances to Step S109. In doing so, new information, which represents a correspondence between the physical block address and the logical block address, is added to the file management BPT.

In Step S109, the CPU 121 determines whether the next block, following the one from which data in its redundant bit area has been read in Step S102, belongs to the zone 0 in the flash memory 11. When determined that the next block belongs thereto, the flow returns to Step S102. On the contrary, when determined that the next block does not belong thereto, the initial process is terminated.

Having performed the above-described initial process, the general BSI for the zone 0, the general BPT for the zone 0, the file management BSI and the file management BPT are created.

Figure 7:
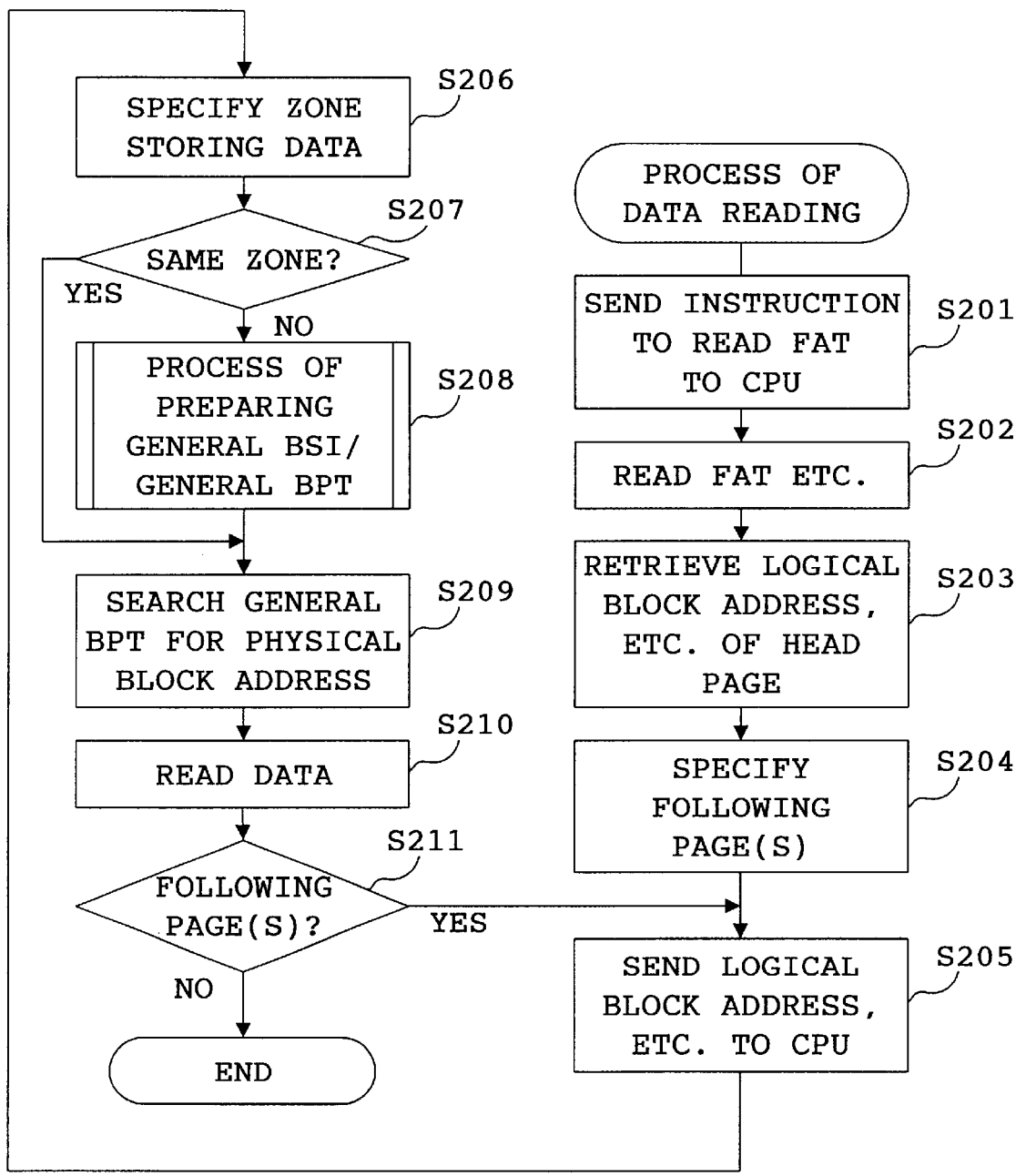
FIG. 7 is a flowchart showing steps of data reading.

(Process of Data Reading, FIG. 7).

Upon completion of the initial process, the CPU 121 included in the memory unit 1 receives from the computer 2 an instruction to access the flash memory 11.

The computer 2 supplies the CPU 121 with an instruction to read data and a logical block address of a block in which directories and an FAT are stored, when to instruct the CPU 121 to read data from the flash memory 11 (Step S201 in FIG. 7).

Upon reception of the instruction to read data and the logical block address, the CPU 121 searches the file management BPT for the logical block address. As a result of this, the CPU 121 retrieves a physical block address affixed to the block in which the directories and the FAT are stored. Then, the CPU 121 reads the directories and the FAT from the block represented by the retrieved physical block address, and supplies the computer 2 with the read directories and the FAT (Step S202). The computer 2 temporarily stores the directories and the FAT which the CPU 121 supplies with.

Upon reception of the directories and the FAT from the CPU 121, the computer 2 searches the directories sent from the CPU 121 for a file name of a target file including data to be read. As a result of this, the computer 2 retrieves a logical block address and a page address of the head page within a particular block, in which the storage contents of the file having the above file name is stored (Step S203).

The computer 2 searches the FAT sent from the CPU 121 for the logical block address and the page address retrieved in Step S203. If the computer 2 receives a logical block address and a page address of a page following the page whose logical block address and the page address are retrieved from the directories, the following pages within the block can be retrieved at this time. The computer 2 then specifies the order numbers in accordance with which the pages are respectively and successively retrieved (Step S204).

Then, the computer 2 supplies the CPU 121 with an instruction to read data, a logical block address and a page address of the head one of the pages, each of which stores data having not yet been read and which are retrieved in Steps S203 and S204 (Step S205).

Upon reception of the instruction to read data and the logical block address and the page address in Step S205, the CPU 121 specifies a zone to which the received logical block address belongs (Step S206).

Then, the CPU 121 reads out the zone information stored in the SRAM 123. Thereafter, the CPU121 determines whether a zone which the read zone information represents coincides with the zone specified in Step S205 (Step S207).

When the CPU 121 determines that both zones coincide with each other in Step S207, the flow advances to Step S209.

Figure 8:
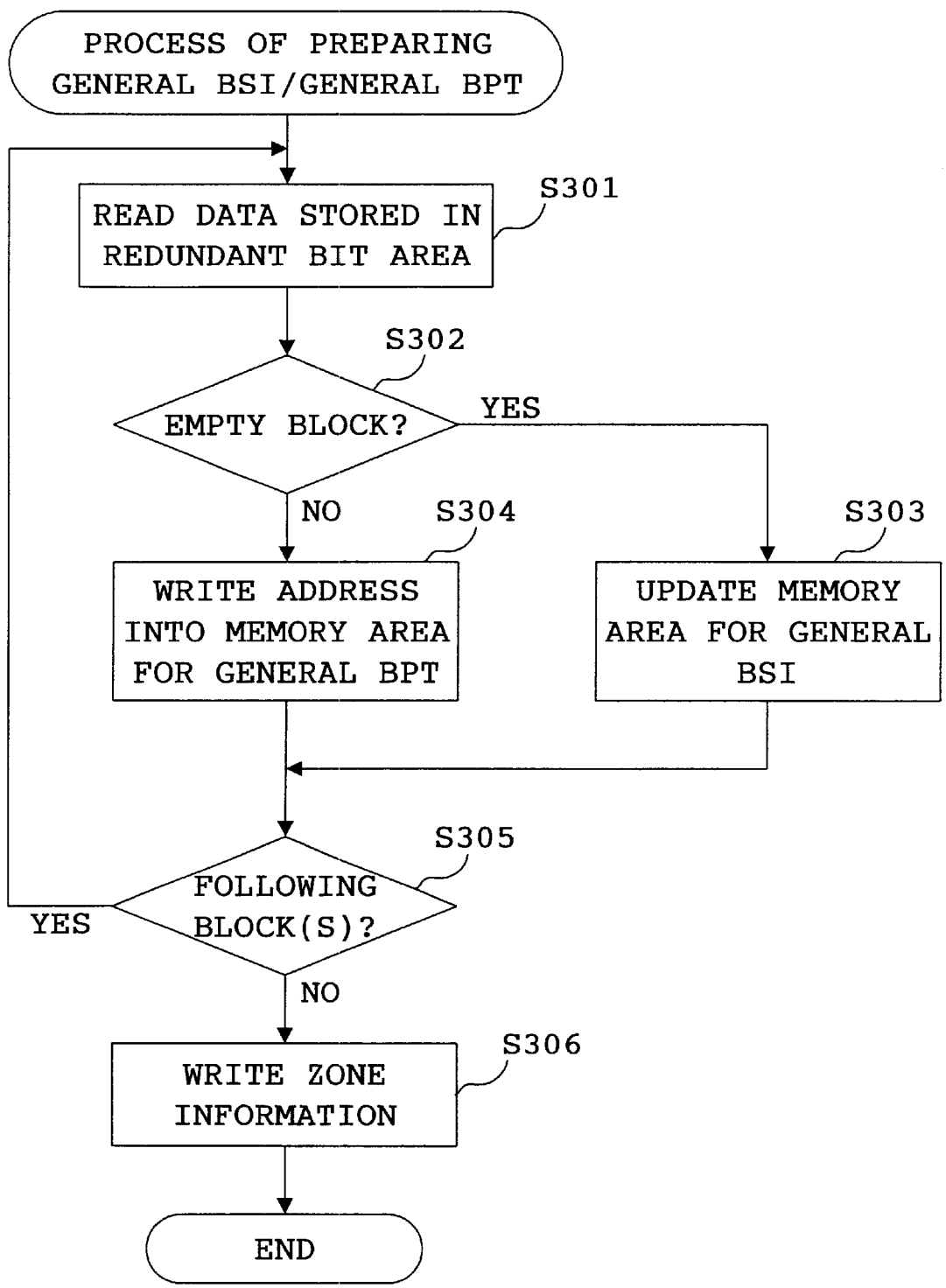
FIG. 8 is a flow chart showing steps of preparing a general BSI and a general BPT.

When the CPU 121 determines that the above described zones do not coincide with each other, it performs a process for preparing a general BSI and a general BPT, shown in FIG. 8, for the zone specified in Step S206 (i.e., the one to which a target block storing data to be read belongs). As a result of this, a new BSI and a new BPT are created (Step S208).

When the above process shown in FIG. 8 begins, the CPU 121 specifies, of blocks which belongs to the zone specified in Step S206, a block from which data in its redundant bit area is not yet read and whose physical block address is the lowest among any other physical block addresses. The CPU 121 reads data stored in a redundant bit area of a page within the specified block (Step S301 in FIG. 8).

Then, the CPU 121 determines whether or not the block from which data has been read in Step S301 is an empty block, on the basis of the data read in Step S301 (Step S302). This determination is performed substantially in the same manner as that in Step S103, for example.

When it is determined that the block is not an empty block, the flow advances to Step S304. When it is determined that the block is an empty block, the CPU 121 calculates bit positions corresponding to the physical block address affixed to the block, in a memory area of the SRAM 123 which stores the general BSI. Then, the CPU 121 updates a logical value of any calculated bit (Step S303) to "1", and the flow advances to Step S305.

In Step S304, the CPU 121 writes a physical block address of a block whose logical block address has been read out, to a memory area of the SRAM 123, which stores the general BPT and to which an address corresponding to the logical block address included in the data read out from the flash memory 11 in Step S301 is affixed, and then the flow advances to Step S305.

In doing this, new information representing a correspondence between the physical block address and the logical block address is added into the general BPT.

In Step S305, the CPU 121 determines whether or not the next block following the one, from which data in its redundant bit area has been read in Step S301, belongs to the zone specified in Step S206. When determined that the next block belongs thereto, the flow returns to Step S301. When determined that the next block does not belong thereto, the CPU 121 writes into the SRAM 123 the zone information representing the zone specified in Step S206 (Step S306), and the process for preparing a general BSI and a general BPT is terminated.

If the CPU 121 completes the process for preparing a general BSI and a general BPT in Step S208, it begins to perform the procedure of Step S209 s hown in FIG. 7.

In Step S209, the CPU 121 searches the general BPT for the logical block address sent from the computer 2 in Step S205. As a result of this, the physical block address corresponding to the above logical block address is retrieved. Then, the CPU 121 reads out data from the page represented by the physical block address and the page address retrieved in Step S209, and supplies the computer 2 with the read data (Step S210).

Upon reception of the read data from the CPU 121, the computer 2 determines whether there is any page, of the pages retrieved in Step S203 and S204, from which data has not yet been read (Step S211). When it is determined that there is any, the flow advances to Step S205. When it is determined that there is no such a page, the process is terminated.

By the so-far explained procedures of steps S201 to S211, the data stored in the flash memory 11 is read out therefrom, and then sent to the computer 2. In this storage system, it is not necessary that the file management BPT is created again, in the process for reading the directories and the FAT. Thus, an increase in the number of times the file management BPT is created over again during the process of data reading is preventable. In addition, an increase in the period of processing time for creating the file management BPT over again during the process of data reading is also preventable.

(Process of Data Writing, FIG. 8).

Figure 9A:
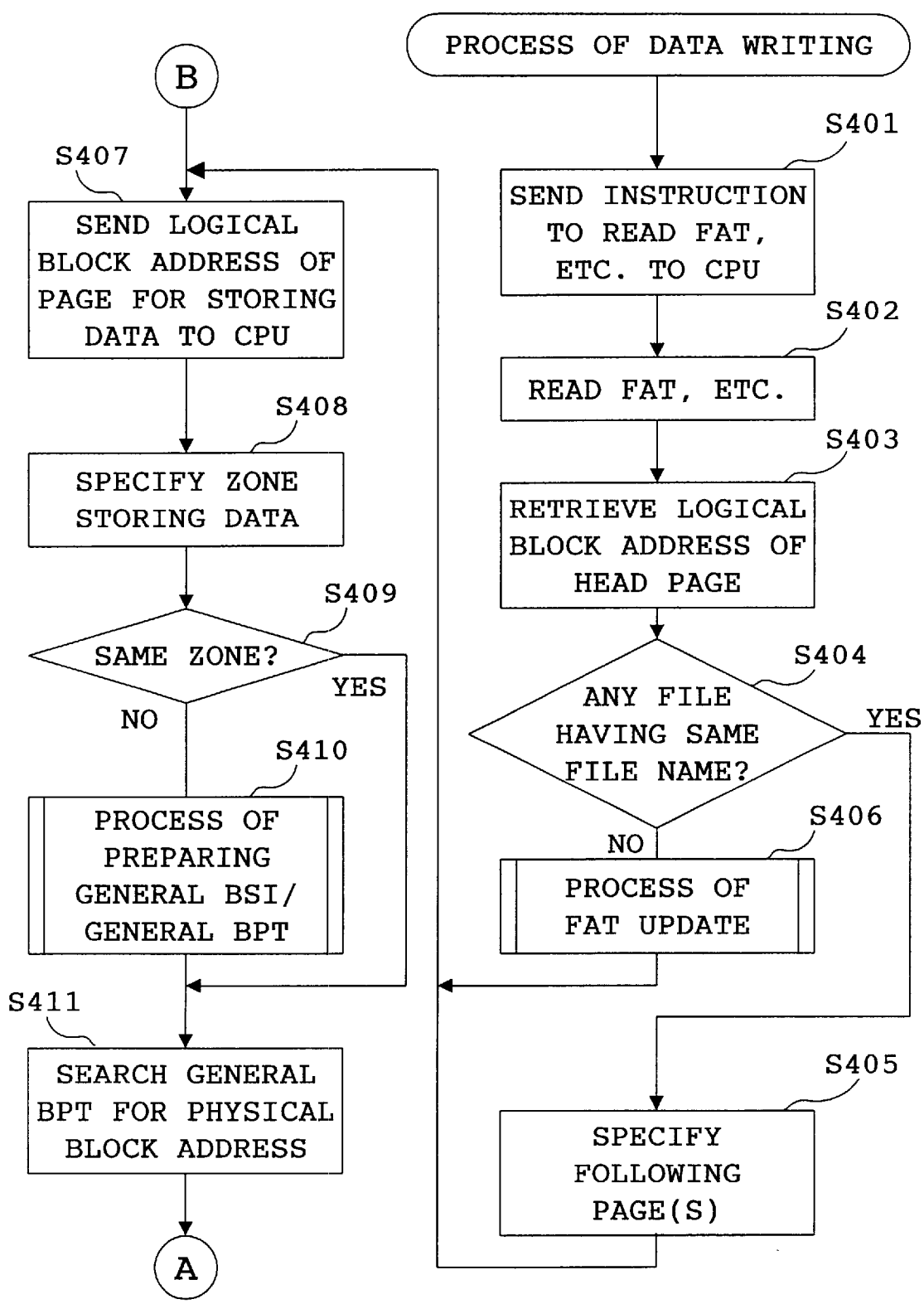
FIGS. 9A and 9B are flowcharts showing steps of data writing.

In the case where data is written into the flash memory 1, the computer 2, likewise in Step S201, supplies the CPU 121 with an instruction to read data and a logical block address of a block in which directories and a FAT are stored (Step S401 in FIG. 9A).

Upon reception of the instruction to read data and the logical block address, the CPU 121 performs substantially the same procedure as that of Step S202 so as to read the directories and the FAT, and supplies the computer 2 with the read directories and the FAT (Step S402). Then, the computer 2 temporarily stores the directories and the FAT sent from the CPU 121.

Then, the computer 2 searches the directory sent from the CPU 121 for a file name of a file to be written in the flash memory 11. As a result of this, if there are found a logical block address and a page address which are affixed to the head page of a block storing the file having the above file name, those addresses can be retrieved (Step S403).

The computer 2 determines whether or not such a logical block address and page address are retrieved (Step S404).

When it is determined that the logical block address and the page address are retrieved, the computer 2 searches the FAT sent from the CPU 121 for the logical block address and the page address retrieved in Step S403. If there are found a logical block address and a page address which are affixed to a page following the page, having a logical block address and a page address retrieved from the directories, the following pages within the block can be retrieved at this time. Thereafter, the computer 2 specifies order numbers in accordance with which the pages are respectively and successively retrieved (Step S405), and the flow advances to Step S407.

Figure 10:
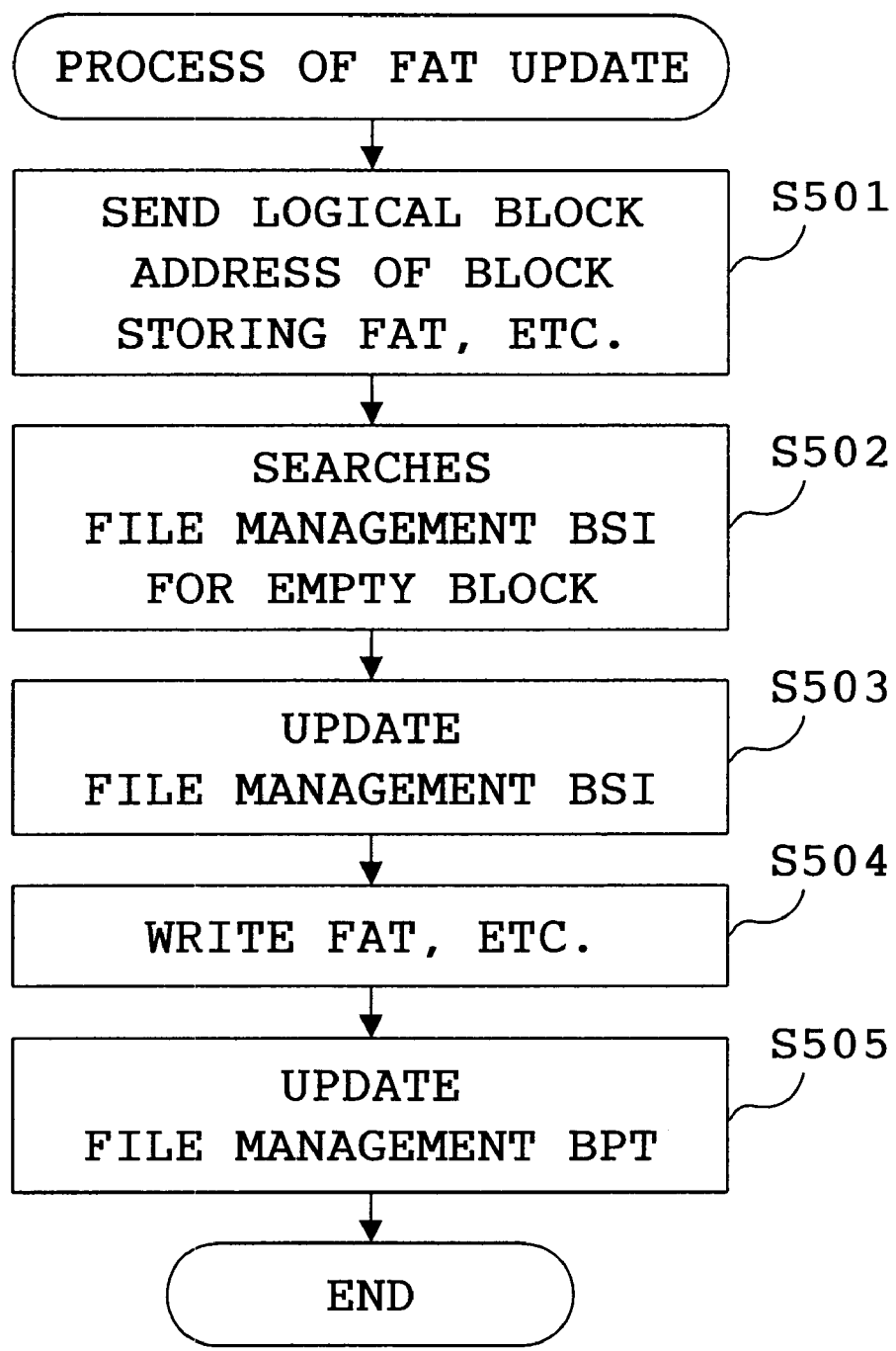
FIG. 10 is a flowchart showing steps of FAT update.

When it is determined that the logical block address and the page address are not retrieved, the storage system of this invention performs a process of FAT update, which is shown in FIG. 10, (Step S406).

When the process shown in FIG. 10 begins, the computer 2 supplies the CPU 121 with an instruction to write data in the flash memory 11 and a logical block address of a block in which directories and a FAT are stored (Step S501).

The computer 2 analyzes the directories and the FAT which have been sent thereto in Step S401, and specifies a logical block address and a page address of a page into which no data is written, for example. Then, the computer 2 determines to write data to be written in the page which the specified logical block address and the page address represent. Furthermore, the computer 2 updates the directories and the FAT, which are temporarily stored therein, in such a way that they show the result of the determination. By doing this, the directories and FAT to be newly written in the flash memory 11 are created.

Upon reception of the instruction to write data and the above logical block address, the CPU 121 retrieves physical block addresses of 256 empty blocks from the file management BSI, so that new directories and a new FAT can be stored in the flash memory 11 (Step S502).

Thereafter, the CPU 121 accesses also the file management BSI. The CPU 121 updates the file management BSI such that the storage contents do not represent the blocks, whose physical block addresses have been retrieved in Step S502, as empty blocks (Step S503).

The CPU 121 sends, to the computer 2, an instruction to send data to be written. Then, the computer 2 supplies the CPU 121 with the directories and the FAT, which the computer 2 temporarily stores, in accordance with the sent instruction. The CPU 121 sequentially writes the directories and the FAT into the head and the successive blocks whose physical block addresses have been retrieved in Step S502 (Step S504). In Step S504, the CPU 121 writes 256, as logical block addresses, addresses of 0000h to 00FFh into 256 blocks in one-to-one correspondence with each other.

The CPU 121 accesses also the file management BPT. Then, the CPU 121 writes a physical block address of any block into which the directories and the FAT have been written in Step S504, into the memory area of the file management BPT, for storing the physical block address of the block from which the FAT and the directories have been read out in Step S402 (Step S505).

The logical block address which has previously been affixed to the block, in which the directories and the FAT read out in Step S402 (hereinafter referred to as an "old FAT, etc.") are stored, is now affixed to any block in which writing of new directories and a new FAT is completed.

If the procedure of Step S505 is completed, the CPU 121 completes the process of FAT update. When the process is completed, the CPU 121 informs the computer 2 of the completion of the process.

After the procedure of Step S404, the computer 2 completes the procedure of Step S405 or is informed about the completion of the process of updating the FAT by the CPU 121. Then, the computer 2 supplies the CPU 121 with an instruction to write data to the flash memory 111, a logical block address and a page address of a target page, into which data of a target file to be written is written (Step S407 in FIG. 9A).

The logical block address and the page address which the computer 2 sends to the CPU 121 in Step S407 may represent:

(a) the head page into which any data has not yet been written and whose logical block address and page address are retrieved in Step S403; or (b) the head page into which any data has not yet been written and which has been determined as a target page, into which data is newly written, when creating new directories and a new FAT during the process of FAT update in Step S406.

Upon reception of the instruction to write data and the logical block address and the page address in Step S407, the CPU 121 specifies a particular zone to which the received logical block address and the page address belong (Step S408).

The CPU 121 reads out the zone information stored in the SRAM 123. Thereafter, the CPU 121 determines whether the zone represented by the read zone information coincides with the zone specified in Step S408 (Step S409).

When it is determined that the zone represented by the zone information and the specified zone coincide with each other, the flow advances to Step S411.

When it is determined that both of the zones do not coincide with each other, the CPU 121 performs substantially the same process as that of preparing a general BSI and a general BPT shown in FIG. 8, and prepares a new BSI and a new general BPT (Step S410), and the flow advances to Step S411. It should be noted that the CPU 121, in Step S410, deals with the zone specified in Step S408 in the same manner as that specified in Step S206.

In Step S411, the CPU 121 searches the general BPT for the logical block address sent thereto in Step S407. After this retrieval, as long as there is any physical block address corresponding to the above logical block address, this physical block address can be retrieved. Then, the CPU 121 determines whether the physical block address has been retrieved in Step S411 (Step S412 in FIG. 9B).

When it is determined that no physical block address is retrieved, the CPU 121 initializes the save memory area included in the SRAM 123 (Step S413). Particularly, the CPU 121 erases the data stored in the save memory area (specifically, the CPU 121 updates each bit value of the data stored therein to "1"), and the flow advances to Step S415.

When determined that any physical block address is retrieved, the CPU 121 reads out data stored in a block which the retrieved physical block address represents, and stores the read data in the save memory area of the SRAM 123 (Step S414), and the flow advances to Step S415.

Figure 11:
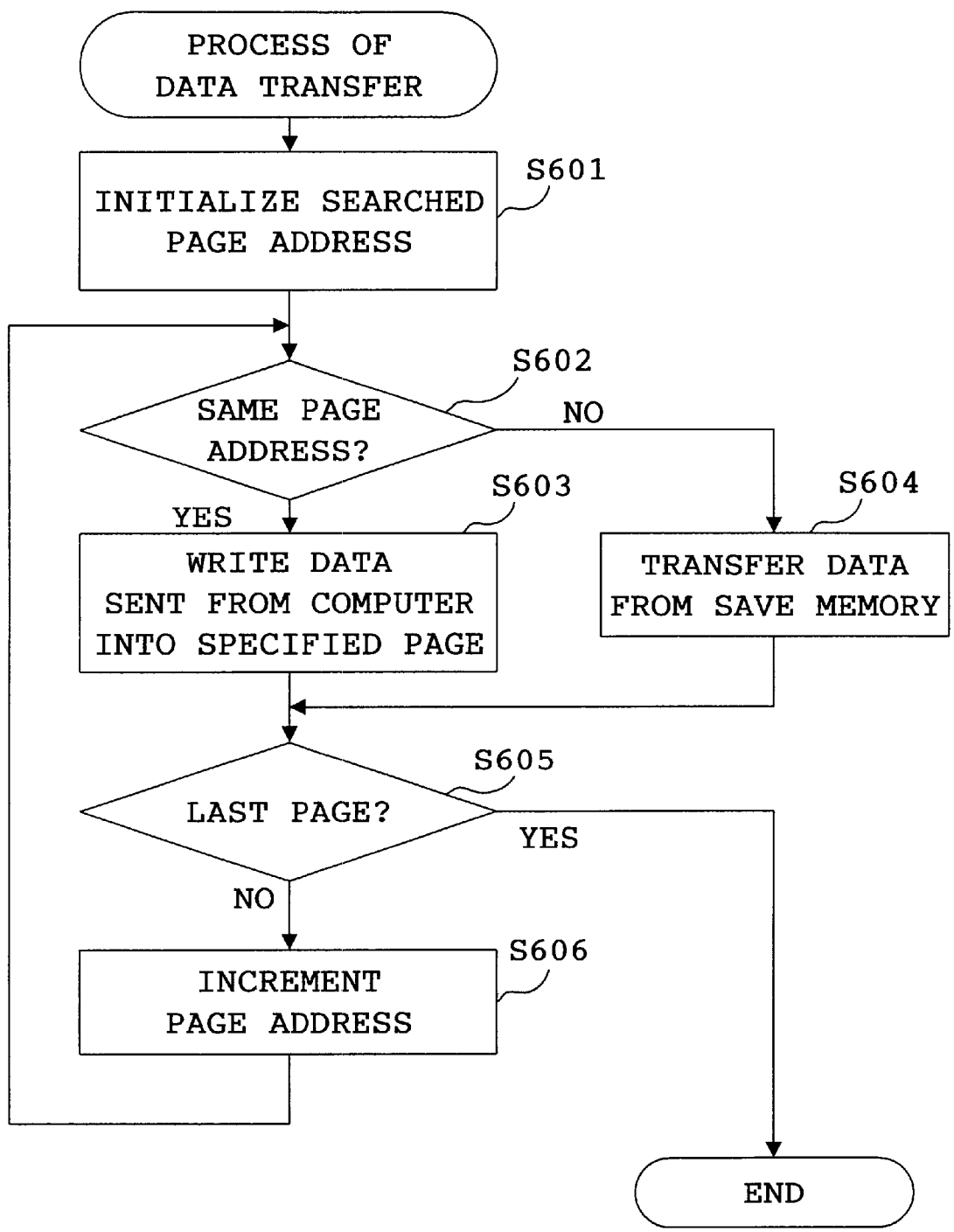
FIG. 11 is a flowchart showing steps of data transfer.

In Step S415, the CPU 121 searches the general BSI for a physical block address of a single empty block, into which data is newly written, and performs a process of data transfer which is shown in FIG. 11 (Step S416).

When the process of data transfer begins, the CPU 121 declares the use of a storage register which stores a variable representing a target page into which data is written in Steps S603 and 604, as will be explained later. The CPU 121 stores in the storage register a page address of the head page within the block retrieved in Step S415 (Step S601 in FIG. 11).

The CPU 121 determines whether the page address, which is currently stored in the storage register, coincides with the page address sent from the computer 2 in Step S407 (Step S602).

When it is determined that both page addresses coincide with each other, the CPU 121 sends to the computer 2 an instruction to send any data items, of data included in a file, which are to be stored in a page indicated by the page address stored in the storage register. Then, the computer 2 supplies the CPU 121 with the corresponding data items in accordance with this instruction.

The CPU 121 writes the data items thus sent from the computer 2 into the page which is specified by the physical block address retrieved in Step S415 and the page address stored in the storage register (Step S603), and the flow advances to Step S605.

In Step S602, when it is determined that those page addresses do not coincide with each other, the CPU 121 reads out from the save memory area the data items stored in the page indicated by the same page address as that stored in the storage register. To be more specific, such data items are included in the block from which data have been transferred (i.e., the one from which data has been read out in Step S414), and are included in the data transferred into the save memory area in Step S414.

The CPU 121 then writes the read data into the page specified by the physical block address retrieved in Step S415 and the page address stored in the storage register (Step S604), and the flow advances to Step S605.

In Step S605, the CPU 121 determines whether the page address stored in the storage register indicates the last page within the target block into which data is written. When it is determined that the page address does not indicate the last page therewithin, the CPU 121 increments the page address stored in the storage register (Step S606). Particularly, the CPU 121 updates the page address stored in the storage register, so that such a page address indicates the next page of the currently-stored page address. If the procedure of Step S606 is completed, the flow advances to Step S602.

Figure 9B:
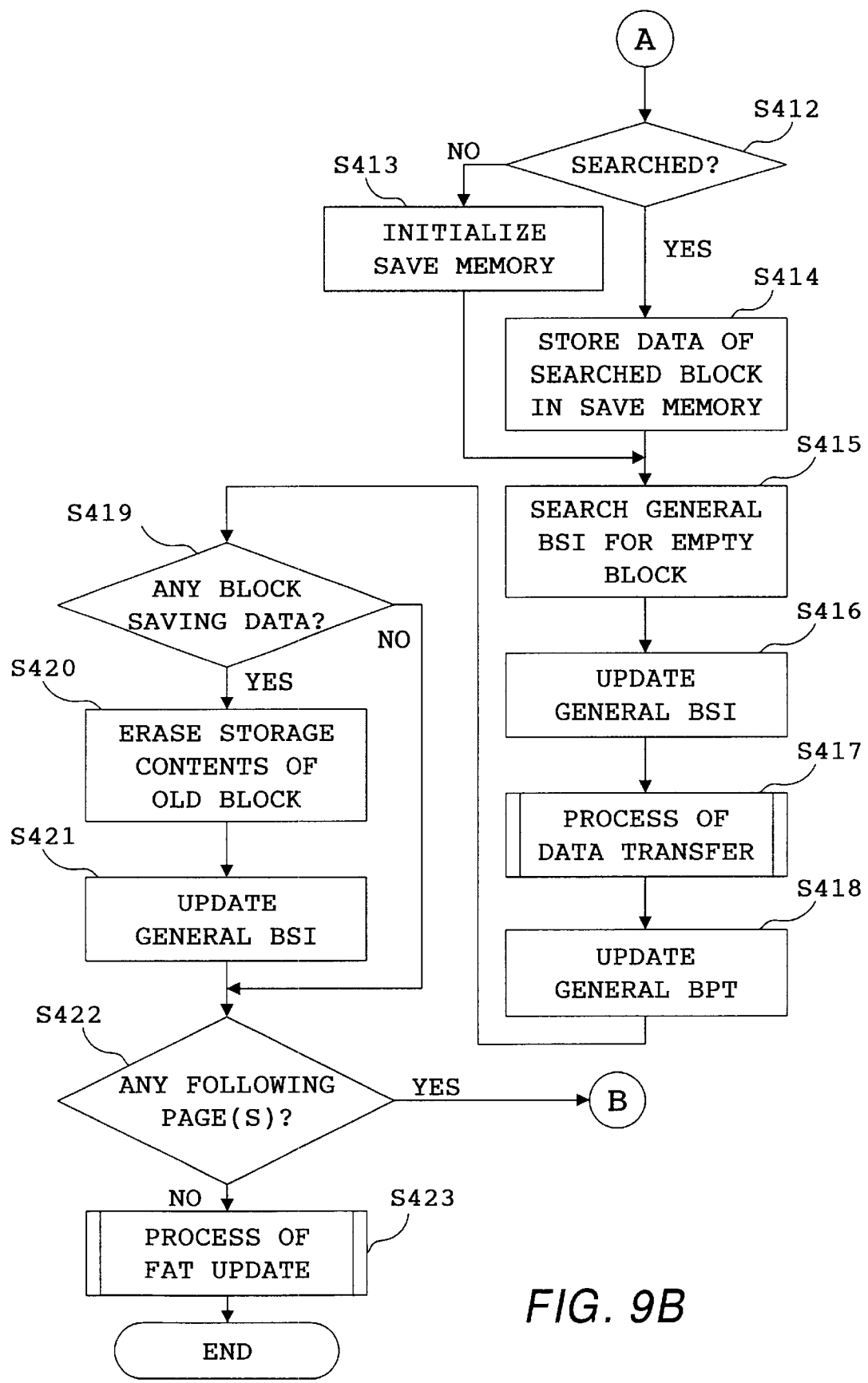

In Step S605, when determined that the page address stored in the storage register indicates the last page within the target block into which data is written, the CPU 121 terminates the process of data transfer, and the flow advance to Step S418 which is shown in FIG. 9B.

In Step S418, the CPU 121 accesses the general BPT. The CPU 121 writes a physical block address of the block, into which data is newly written in the procedure of data transfer in Step S417, into the memory area storing the physical block address retrieved in Step S411, within the general BPT.

If no physical block address is retrieved in Step S411, the CPU 121 overwrites the physical block address in each memory area storing a predetermined value (e.g., the above-described value "0FFFh") representing that no physical block address is affixed to the memory area, within the general BPT.

According to the above procedures, the logical block address, previously corresponding to the physical block address retrieved in Step S411, or the logical block address, previously corresponding to no physical block address, will newly be corresponding to the physical block address representing the block into which data has newly been written.

Then, the CPU 121 again determines whether any physical block address has been retrieved in Step S411 (Step S419). When it is determined that no physical block has been retrieved, the flow advances to Step S422.

When it is determined that a corresponding physical block address has been retrieved, the CPU 121 resets a block which the physical block address retrieved in Step S411 represents (i.e., the one from which data has been transferred during the process of data transfer). Then, the CPU 121 writes an empty block code into each redundant bit areas of pages which belong to the reset block (Step S420).

After that, the CPU 121 accesses also the general BSI. The CPU 121 updates the storage contents of the general BSI so that the block reset in Step S420 is indicated as an empty block (Step S421), and informs the computer 2 of completion of data writing.

After the CPU 121 informs the computer 2 of the completion of data writing in Step S421, the computer 2 determines whether there remains any page from which data should be written into the flash memory 11 (Step S422). When it is determined that there remains such a page, the flow returns to Step S407. When it is determined that there is no such a page, the storage system again performs substantially the same process as the process of FAT update which is shown in FIG. 11 (Step S423), and terminates the process of data writing.

During the process of FAT update performed in Step S423, i.e., while updating the directories and the FAT stored in the computer 2, the computer 2 deals with the logical block address and the page address, sent to the CPU 121 in Step S407 in correspondence with a file name of target data to be written.

According to the so-far described processes, the data sent from the computer 2 is thus stored in the flash memory 11. The storage contents of the general BSI are so updated as to represent any empty blocks, which are empty as a result of transferring data therefrom, and any blocks, which are not empty as a result of transferring data thereinto. The storage contents of the file management BSI are updated as to represent any new empty block, which is empty as a result of FAT update and belongs to the zone 0, and any blocks which are not empty as a result of FAT update and belong to the zone 0.

The storage contents of the general BPT are also updated. As a result of this, the logical block address, which had previously been assigned to a block which is currently an empty block as a result of transferring data therefrom, is newly assigned to a block, into which data is transferred from the currently-empty block. The storage contents of the file management BPT are updated such that the logical block address, which was previously assigned to the block storing the old FAT, etc., is newly assigned to a block storing an updated FAT and directories.

The structure of the storage system of this invention is not limited to the above.

For example, the number of zones to which the memory areas in the flash memory 11 respectively belong, the number of blocks in each zone, the number of pages per block, the storage capacity of each page, the storage capacity of each data area, and the storage capacity of each redundant bit area are all arbitrary. It is not necessary that the flash memory 11 employs an EEPROM, so that the flash memory 11 may be an arbitrary storage device which is readable by a computer.

Moreover, it is not necessary that the zone where the directories and the FAT are stored is the zone 0, thus the directories and the FAT may be stored in any other zones. In the storage system, during the procedures of the initial process shown in FIG. 6, the general BPT of the zone where the directories and the FAT are stored may be created.

The number of blocks in which the directories and the FAT are prepared may not necessarily be 256, but is arbitrary.

The value of the logical block address assigned to the block, in which the directories and the FAT are prepared, is not limited to the above, but is arbitrary.

The information representing the memory area of the flash memory 11, in which data is stored, may arbitrarily be formed. Thus, in stead of the physical block addresses and the page addresses, information in a CHS (Cylinder-Head-Sector) mode may be employed, for example. The information in a CHS mode represents each section of a virtual memory area having the size corresponding to the size of the memory area of the flash memory 1, wherein the virtual memory area is divided into sections hierarchically in three levels of cylinder, head and sector. Instead of the logical block address, information in a CHS mode may be employed.

The CPU 121 may store in the SRAM 123 a logical block address and a physical block address, in association with each other, which are assigned to the page storing data accessed previously by the CPU 121. Otherwise, the CPU 121 may store the data itself According to this structure, in the case where each file name stored in the flash memory 11 is formed in the hierarchical structure, for example, an attempt to read data of various files in the same level of hierarchy successively at high speed may be achieved. Particularly, data of various files in the same level of hierarchy may successively be read at high speed, in the case where:

(a) each of the file names includes a name of one or more levels in hierarchy; and (b) a file (folder) having a file name which is the same as the name of its level in hierarchy stores a logical position (i.e., a logical block address and a page address) of a folder in a level which is right lower than the above level in hierarchy, and its name (folder name).

Specifically, in terms of any file being under the control of MS-DOS (trademark) developed by Microsoft Corporation, a file is specified by a folder name constituted by a character string, wherein each character string is marked off with a mark "\". A character string sandwiched by two of the mark "\" represents the name of a corresponding level in hierarchy. The header the character string, the higher the level in hierarchy.

In order to specify a logical block address and a page address of the head page within a block in which the storage contents of a file is stored, it is necessary to specify and read the logical position of a folder whose name is at the highest level in hierarchy, with reference to the FAT. Then, it is necessary to specify and read the folder name stored in the read folder and the logical position of a folder having the same folder name as the above folder and being at a lower level in hierarchy with respect to the read folder. Until the logical position of the storage contents of the file can be specified, the above process of specifying and reading the folder name of each folder successively at a lower level in hierarchy and the logical position thereof is sequentially repeated.

Accordingly, in the case where a file name is formed in the hierarchical structure, the storage system performs the process of reading the folder in accordance with the procedures of Steps S201 to S211. In the case where the plurality of folders, which are successively read out so that one ore more target files are read, are stored in various zones in the flash memory 11, the storage system prepares a general BSI and a general BPT in Step S208 every time each folder is read.

Thus, as long as the plurality of files are at the same level in hierarchy, in the case where the storage contents of the files are successively read out one after another, the process of preparing a general BSI and a general BPT requires a large amount of time during the process of reading the storage contents of the files. This results in an increase in the time necessary for the reading process.

Let it be assumed that the CPU 121 stores in the SRAM 123 a logical block address and a physical block address of a page in which data accessed by the CPU 121 is stored, in association with each other, or stores such data in itself. After the determination in Step S207 and before carrying out the procedure of Step S208, the CPU 121 retrieves a logical block address and a physical block address stored in the SRAM 123 or in itself. If a physical block address corresponding to the logical block address sent from the computer 2 is retrieved, the CPU 121 determines to deal with the retrieved physical block address as one retrieved in Step S209, and the flow advances to Step S210.

The general BPT stored in the SRAM 123 may show a zone representing a correspondence between a plurality of logical block addresses and a plurality of physical block addresses, and another zone storing a target folder and a file to be read. Even in that case, if a logical block address and a physical block address affixed to a target folder or a file to be read are stored in the SRAM 123 or in the CPU 121, the procedure of Step S208 can be omitted. Thus, a reduction in the time required for the process of data reading can be achieved.

An explanation will now be made to a case where, for example, two files (one having a file name of "\work0\teldevice\ddc\data0\file000.dat", and the other one having a file name of "\work0\teldevice\ddc\data0\file001.dat") are successively read out.

In such a case, it is assumed that folders respectively having folder names of "work0", "teldevice", "ddc" and "data0" are stored sequentially in the zones 1, 2, 3 and 0, and that files respectively having file names of "file000.dat" and "file001.dat" are both stored in the zone 1.

In this case, the CPU 121 performs the following steps of:
(1) reading the directories and the FAT;
(2) reading, in a sequential order, the folders respectively having the folder names of "work0", "teldevice", "ddc" and "data0", and the file having the file name of "file000.dat";
(3) reading the directories and the FAT, again; and
(4) reading, in a sequential order, the folders respectively having the folder names of "work0", "teldevice", "ddc", and "data0", and the file having the file name of "file001.dat".

In order to achieve these steps, the CPU 121 needs to access, in a sequential order, the zones 0, 1, 2, 3, 0, 1, 0, 1, 2, 3, 0 and 1. Thus, the CPU 121, included in the storage system which performs the above-described procedures of Steps S201 to S211 as a process of reading a folder, needs to perform the process of creating a general BPT for five times during each of the steps of (2) and (4), i.e., for ten times in total.

The SRAM 123 or the CPU 121 stores four sets of logical and physical block addresses each one set of which is affixed to one of four pages storing the folders respectively having the folder names of "work0", "teldevice", "ddc" and "data0", in association with each other. In addition, after the determination performed in Step S207 and before Step S208, as long as the CPU 121 retrieves the logical block address and the physical block address stored in the SRAM 123 or in itself, and deals with the retrieved addresses as those retrieved in Step S209, then the process of creating a general BPT to be performed for five times during the step of (4) can be omitted.

The SRAM 123 and the CPU 121 need not store every logical block address and physical block address corresponding to data which the CPU 121 has accessed before. Therefore, the SRAM 123 may include a given memory area for storing every logical block address and physical block address corresponding to such data accessed by the CPU 121 before. In this structure, the CPU 121 may store a given number of logical block addresses and physical block addresses, to such an extent that the memory area is capable of storing.

In the above procedure of Step S406 and S423, the storage system of this invention searches the file management BSI for any physical block addresses of empty blocks, and in the above procedure of Step S415, the CPU 121 searches the general BSI for any physical block addresses of empty blocks. In any of the above cases, the CPU 121 may retrieve any empty block addresses following a block, into which data has been written in the end in the procedures of Steps S406, S417 and S423, in a sequential order from the one having the lowest physical block address to the one having the highest physical block address within one zone, from one zone to another (note that if there is no empty block following such a block, the head empty block is retrieved).

In such a case, particularly, regarding each of the zones of the memory area included in the flash memory 1, the CPU 121 writes a physical block address of an empty block, into which data has been written in the end in any of the procedures of Steps S406, S417 and S427, in a given memory area of a corresponding zone of the flash memory 11.

In Steps S406, S415 and S423, the CPU 121 reads out the physical block address stored in the memory area of the target zone, into which data is written. The CPU 121 then retrieves the head empty block following a block which the read physical block address represents. It should be noted that in the case where there is no corresponding empty block within the target zone, into which data is written, the lowest physical block address is retrieved from any blocks which belong to the zone.

Accordingly, the process of writing data into empty blocks is cyclically performed within one zone, from one zone to another. This eliminates the possibility that data is frequently updated only in certain blocks. Hence, it is preventable that only some of the blocks are deteriorated in its performance.

The CPU 121 specifies the head empty block following the block, into which data is written in the end in the procedures of Steps S406, S417 and S423, within the same zone (note that if there is no head empty block following such an empty block, the CPU 121 simply specifies the head empty block), by searching the file management BSI or the general BSI. Then, the CPU 121 may write, in a particular redundant bit area of the specified empty block, mark data representing that the specified empty block is a next target empty block, into which data is written at the next time.

In the procedures of Steps S406, S415 and S423, the CPU 121 searches the redundant bit area(s) of each empty block in the flash memory 11 for the mark data. Then, the CPU 121 retrieves empty blocks following the empty block, from which the mark data has been searched, in a sequential order from the lowest physical block address. By doing this, the process of writing data into empty blocks is cyclically performed within one zone, from one zone to another.

In particular, in a case where the flash memory 11 is a NAND-type EEPROM, the mark data is given in a hexadecimal two-digit value, besides the value "00h", for example. In this case, data is written in a redundant bit area of the empty block, into which the mark data is written. In this structure, the memory area where the mark data is written can be updated by overwriting the value "00h" therein, thereby deleting the mark data. Accordingly, the process of erasing the storage contents of an empty block in order to delete the mark data is not necessary.

Figure 12:
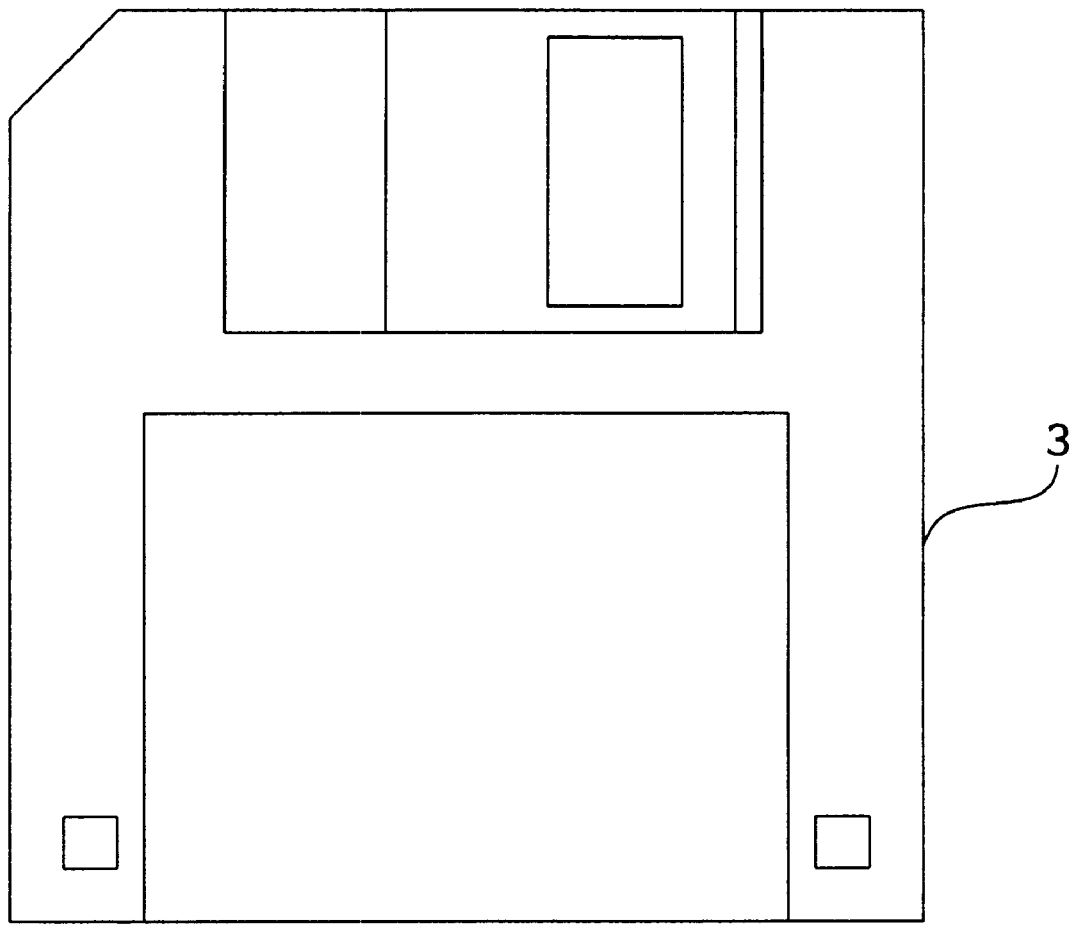
FIG. 12 is a diagram showing a floppy disk storing a program which causes a computer to realize the embodiment of the present invention.

The explanations have been made to the embodiment of the present invention. The storage system of this invention is not limited to a dedicated system, and can be realized using an ordinary computer system. The storage system which executes the above-described processes can be realized installing programs for carrying out the above-described processes into computers, including the slot for installing the flash memory 11 therein, from any medium (e.g., the floppy disk 3, a CD-ROM or the like shown in FIG. 12) which stores the programs.

For example, the programs may be presented on the bulletin board of the communications network and may be supplied to the computers via the network.

Figure 13:
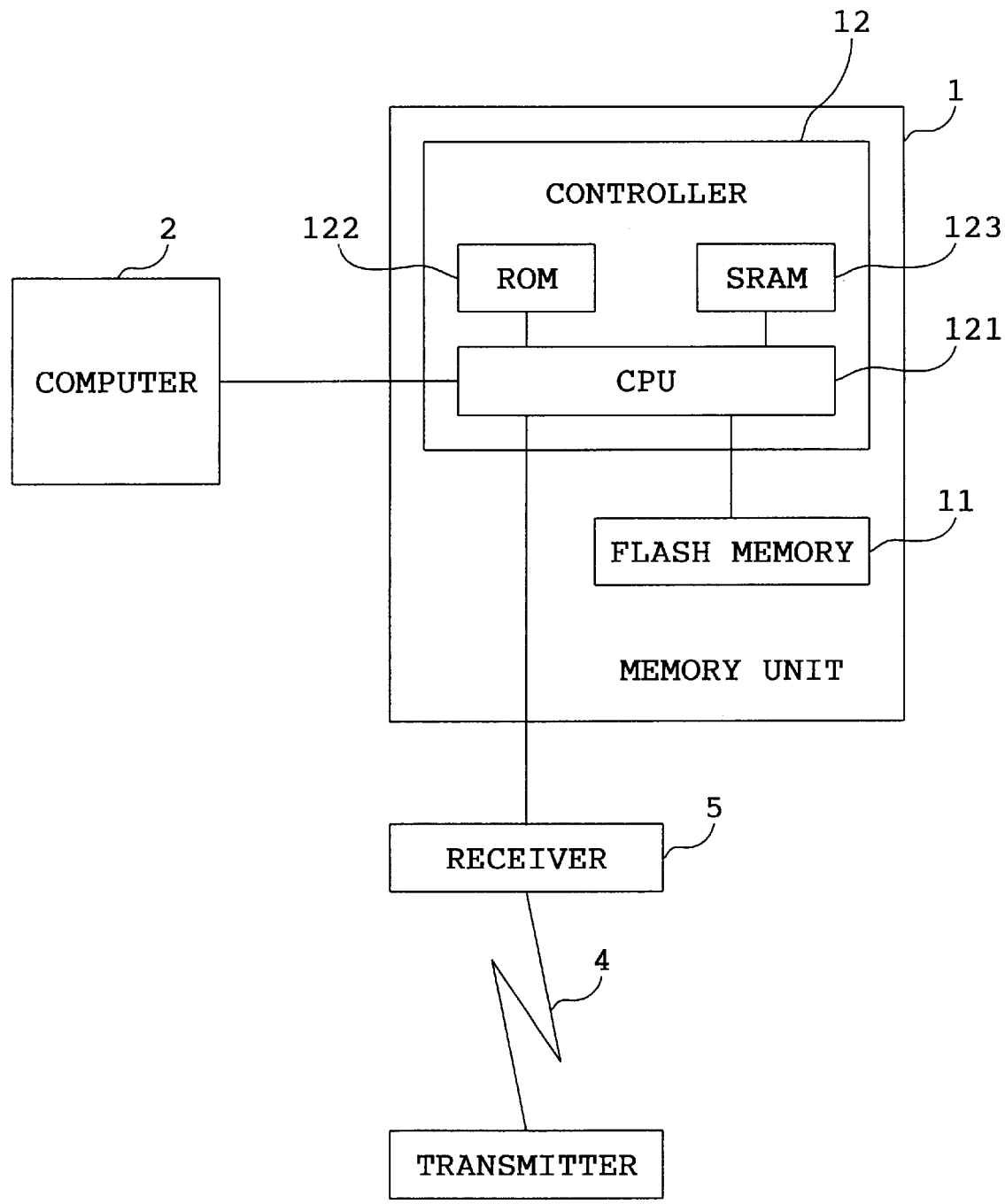
FIG. 13 is a diagram showing the structure required for distributing a carrier wave signal embodying the program which causes a computer to realize the embodiment of the present invention.

As shown in FIG. 13, a modulation wave 4 in which a carrier wave has been modulated using a signal representing the programs may be transmitted via a receiver 5 to computers which are to have a function as the access device 2 or the controller 12.

Then, the above programs are activated and executed under the control of the OS so as to carry out the above-described processes, as well as other application programs.

In a case where a part of the above processes is assigned to the OS or where the OS is included in the present invention as a component part thereof, programs excluding that part of the OS may stored on the medium. In this case, programs for executing functions or steps to be carried out by the computer are stored on the storage medium.

As explained, according to the present invention, the storage device, the storage system, and the memory management method, can be realized, thereby the process of preparing the address conversion table is performed with low frequency while accessing data.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. H11-112222 filed on Apr. 20, 1999 and including specification, claims, drawings and summary. The disclosure of the above Japanese Patent Application is incorporated herein by reference in its entirety.

What is claimed is:

1. A storage device comprising:
   a memory which includes a plurality of memory blocks, each of which stores data and belongs to one of a plurality of zones and to each of which a physical block address is assigned; and
   a controller which reads out data stored in the plurality of memory blocks and externally outputs the read data,
   wherein the memory block belonging to a predetermined zone includes a data arrangement memory storing a data arrangement table representing a correspondence between data stored in said memory and a logical address of one memory block storing the data, and
   wherein said controller
      includes a first table memory,
      includes a second table memory,
      creates a first address conversion table, which stores information representing the logical address and a physical address of the one memory block storing the data arrangement table, and stores the created table in said first table memory,
      externally acquires a logical address indicating the data arrangement table, specifies the physical address of the one memory block storing the data arrangement table based on said first address conversion table and the acquired logical address, in response to an externally-transmitted instruction, reads out the data arrangement table from the one memory block represented by the specified physical address, and externally sends the read data arrangement table,
      externally acquires a logical address indicating data to be read, and specifies one of the plurality of zones, to which a memory block represented by the logical address belongs, based on the acquired logical address,
      determines whether said second table memory stores a second address conversion table, which stores information representing a correspondence between the logical address and a physical address of the memory block belonging to the specified zone, and when determined that said second table memory does not store the second address conversion table, creates the second address conversion table, and also stores the created table in said second table memory, and
      specifies, as a physical address indicating data to be read, the physical address corresponding to the externally-acquired logical address, based on the second address conversion table, and reads out and output data stored in the memory block which the specified physical address represents.

2. The storage device according to claim 1, wherein said controller
   includes an access history memory which stores the physical address, which indicates the data to be read and which said controller has specified, and a logical address representing the physical address, in association with the physical address and the logical address, and
   specifies a physical address indicating data to be read, based on the physical address and the logical address which said access history memory stores.

3. The storage device according to claim 1, wherein said controller:
   includes an empty block table memory which stores an empty block table storing information representing one or more empty blocks each of which comprises one memory block;
   selects, of the one or more empty blocks represented by the information stored in the empty block table, a target empty block to store data, when data which is to be written and a logical address indicating the data are sent to said controller; and
   writes the data to be written in the selected block.

4. The storage device according to claim 3, wherein:
   said controller stores origin information in the memory block, for designating an empty block to store data next to a particular block which most-recently stores data,
   said empty block table is to include information representing order numbers which circularly and respectively correspond to the plurality of empty blocks; and
   said controller reads the origin information and successively selects, in accordance with the order numbers which the empty block table represents, one or more empty blocks including and following the empty block designated by the read origin information, when data which is to be written and a physical address indicating the data are sent to said controller.

5. The storage device according to claim 3, wherein: said empty block tables include
   a first empty block table which stores information representing an empty block belonging to a zone including the memory block storing the data arrangement table, and a second empty block table which stores information representing one or more empty blocks each belonging to one of the zones; and said controller determines whether said empty block memory stores the second empty block table, which stores the information representing the empty block belonging to the specified zone, and creates the second empty block table which stores the information representing the empty blocks belonging to the specified zone, and stores the created table in said empty block table memory when determined that said empty block memory does not store the second empty block table, selects a target empty block to store data, of the empty blocks represented by the information stored in said second empty block table, when data which is to be written and a logical address indicating the data are sent to the controller, writes, in the empty block represented by the information stored in said first empty block table, the data arrangement table which has been updated as to represent the correspondence between the data, which the controller itself has written in the empty block, and the logical address indicating the data; and updates said first empty block table as not to represent that the memory block storing the updated data arrangement table is an empty block.

6. The storage device according to claim 5, wherein:

said controller stores origin information in the memory block, for designating an empty block to store data next to a particular block most-recently stores data, said empty block table is to include information representing order numbers which circularly and respectively correspond to the plurality of empty blocks; and said controller reads the origin information and successively selects, in accordance with the order numbers which the empty block table represents, one or more empty blocks including the empty block designated by the read origin information and the empty block following the empty block designated by the read origin information, when data to be written and a physical address indicating the data are sent to said controller.

7. The storage device according to claim 6, wherein:

the origin information is stored in a certain section of an empty block which is to store data next to the particular block which most-recently stores data; and said controller erases the origin information stored in the block storing the data which is to be written, and writes the origin information in the certain section of the empty block which corresponds to an order number following one corresponding to the block most-recently storing data.

8. The storage device according to claim 7, wherein:

each of the plurality of memory blocks comprises a data area and a redundant bit area; and the origin information is stored in the redundant bit area of the empty block which is to store data next to the empty block which most-recently stores data.

9. A storage system comprising:

a memory which includes a plurality of memory blocks, each of which stores data and belongs to one of a plurality of zones, and to each of which a physical address is assigned;

a controller which reads out and outputs data stored in the plurality of memory blocks; and an access device which acquires the data which said controller outputs, and wherein the memory block belonging to a predetermined zone includes a data arrangement memory storing a data arrangement table representing a correspondence between data stored in said memory and a logical address of one memory block storing the data, said controller includes a first table memory, includes a second table memory, and creates a first address conversion table, which stores information representing the logical address and a physical address of the one memory block storing the data arrangement table, and stores the created first address conversion table in said first table memory, said access device provides the controller with a logical address indicating the data arrangement table, said controller specifies the physical address of the one memory block storing the data arrangement table, based on the first address conversion table and the provided logical address indicating the data arrangement table, reads out the data arrangement table from the memory block indicated by the specified physical address, and outputs the read data arrangement table, said access device specifies a logical address indicating data to be read, based on the data arrangement table which said controller has read out, and said controller specifies a zone to which a memory block indicated by the logical address belongs, based on the logical address which said access device specifies, determines whether said second table memory stores the second address conversion table storing information representing a correspondence between the logical address and a physical address of the memory block belonging to the specified zone, creates the second address conversion table in said second table memory when determined that said second table memory does not store the second address conversion table, and stores the created second address conversion table in said second table memory, and specifies, as a physical address indicating data to be read, the physical address corresponding to the logical address which said access device has specified, based on the second address conversion table, reads out and outputs data stored in one memory block represented by the specified physical address.

10. The storage system according to claim 9, wherein said controller includes an access history memory which stores the physical address, which indicates the data to be read and which the controller has specified, and a logical address representing the physical address, in a association with the physical address and the logical address, and specifies a physical address indicating data to be read, based on the logical address and the physical address stored in said access history memory.

11. The storage system according to claim 9, wherein:

said access device supplies said controller with data to be written and a logical address indicating the data; and said controller includes an empty block table memory storing an empty block table, which stores information representing one or more empty blocks each of which comprises one memory block, selects a target empty block, of the one or more empty blocks represented by the information stored in the empty block table, when data which is to be written and a logical address indicating the data are sent to the controller, and writes the data to be written in the selected block.

12. The storage system according to claim 11, wherein:

said controller stores origin information in the memory block, for designating an empty block to store data next to an empty block which most-recently store data, the empty block table is to include information representing order numbers which circularly and respectively correspond to the plurality of empty blocks; and said controller reads the origin information and sequentially selects, in accordance with the order numbers represented by the empty block table, one or more empty blocks including and following the empty block which the read origin information represents, when data to be written and a logical address indicating the data are sent to the controller.

13. The storage system according to claim 11, wherein:

the empty block tables include a first empty block table, which stores information representing an empty block belonging to a certain zone including the memory block storing the data arrangement table, and a second empty block table, which stores information representing an empty block belonging to one of the zones; and said controller determines whether the empty block table stores said second empty block table storing information representing an empty block belonging to the specified zone, and creates the second empty block table which stores the information representing the empty blocks belonging to the specified zone, and stores the created second empty block table in the empty block table memory when determined that the empty block table does not store said second empty block table, selects an empty block to store data, of the empty blocks represented by the information stored in the second empty block table, when data which is to be written and a logical address indicating the data are sent to the controller, writes, in the empty blocks represented by the information stored in the first empty block table, the data arrangement table which has been updated as to represent the correspondence between the data, which said controller itself has written in the empty block, and a logical address indicating the data to be written, and updates the first empty block table not to represent that the memory block storing the updated data arrangement table is an empty block.

14. The storage system according to claim 13, wherein:

said controller stores origin information in the memory block, for designating an empty block to store data next to an empty block most-recently store data, the empty block table is to include information representing order numbers which circularly and respectively correspond to the empty blocks; and said controller reads the origin information and sequentially selects, in accordance with the order numbers represented by the empty block table, one or more blocks including the empty block designated by the read origin information and the empty block following the empty block which the read origin information represents, when data to be written and a logical address indicating the data are sent to the controller.

15. The storage system according to claim 14, wherein:

the origin information is stored in a certain section of an empty block which is to store data next to the memory block which most-recently stores data; and said controller erases the origin information stored in the block storing the data which is to be written, and writes the origin information in the certain section of the empty block which corresponds to an order number following one corresponding to the block which most-recently stores data.

16. The storage system according to claim 15, wherein each of the plurality of memory blocks comprises a data area and a redundant bit area, and the origin information is stored in the redundant bit area of the empty block which is to store data next to the empty block most-recently stores data.

17. A memory management method for managing reading of data from a memory, including a plurality of memory blocks, each of which stores data and belongs to one of a plurality of zones and to each of which a physical address is assigned, and wherein the memory block belonging to a predetermined zone is to store a data arrangement table representing a correspondence between the data and a logical address of the memory block storing the data, said method comprising steps of:

creating and storing a first address conversion table storing information representing a correspondence between the logical address and a physical address of the memory block storing the data arrangement table;

externally acquiring a logical address indicating the data arrangement table, and specifying the physical address of the memory block storing the data arrangement table, based on the first address conversion table and the acquired logical address, in response to an externally-acquired instruction, reading the data arrangement table from the memory block which the specified physical address represents, and externally sending the read data arrangement table;

externally acquiring a logical address indicating data to be read, and specifying a zone to which a memory block, represented by the acquired logical address, belongs based on the acquired logical address;

determining whether a second address conversion table, which stores information representing a correspondence between the logical address and a physical address of the memory block belonging to the specified zone, is created, and creating and storing the second address conversion table when determined that the second address conversion table is not created; and specifying, as a physical address indicating data to be read, the physical address corresponding to the externally acquired logical address, based on the second address conversion table, and reading and outputting data stored in the memory block which the specified physical address represents.

18. A memory management method for managing reading of data from a memory, including a plurality of memory blocks, each of which stores data and belongs to one of a plurality of zones and to each of which a physical address is assigned, and wherein the memory block belonging to a predetermined zone is to store a data arrangement table representing a correspondence between the data and a logical address of a memory block storing the data, said method comprising steps of:

creating and storing a first address conversion table, which stores information representing a correspondence between the logical address and a physical address of one memory block storing the data arrangement table;

externally acquiring a logical address indicating the data arrangement table, and specifying a physical address of a memory block storing the data arrangement table, based on the first address conversion table and the acquired logical address, in response to an externally-sent instruction, and reading the data arrangement table from the memory block which the specified physical address represents;

specifying a logical address indicating data to be read, based on the read data arrangement table;

specifying a zone to which a memory block represented by the logical address belongs, based on the specified logical address;

determining whether a second address conversion table, which stores information representing a correspondence between the logical address and a physical address of the memory block belonging to the specified zone, is created, and creating and storing the second address conversion table when determined that the table is not created; and specifying, as a physical address indicating data to be read, the physical address which the specified logical address represented, and reading and outputting data stored in the memory block represented by the specified physical address, based on the second address conversion table.

19. A storage device comprising:

storage means having a plurality of memory blocks, each of which stores data and belongs to one of a plurality of zones and to each of which a physical block address is assigned; and reading means for reading out data stored in the plurality of memory blocks and externally outputs the read data, wherein the memory block belonging to a predetermined zone further comprising data arrangement memory storing means for storing a data arrangement table representing a correspondence between data stored in said memory and a logical address of one memory block storing the data, and wherein said reading means further comprising;

first table storing means for creating a first address conversion table, which stores information representing the logical address and a physical address of the one memory block storing the data arrangement table, and storing the created table, data arrangement table searching means for externally acquiring a logical address indicating the data arrangement table, and specifying the physical address of the one memory block storing the data arrangement table based on said first address conversion table and the acquired logical address, in response to an externally-transmitted instruction, and reading out the data arrangement table from the one memory block represented by the specified physical address, and also externally sending the read data arrangement table, zone specifying means for externally acquiring a logical address indicating data to be read, and specifying one of the plurality of zones, to which a memory block represented by the logical address belongs, based on the acquired logical address, second table storing means for determining whether said second table memory stores a second address conversion table, which stores information representing a correspondence between the logical address and a physical address of the memory block belonging to the specified zone, and when determined that said second table memory does not store the second address conversion table, creating the second address conversion table, and also storing the created table, and data searching means for specifying, as a physical address indicating data to be read, the physical address corresponding to the externally-acquired logical address, based on the second address conversion table, and reading out and output data stored in the memory block which the specified physical address represents.

20. A computer readable recording medium which stores programs for making a computer function as a controller, which is connected to a memory, including a plurality of memory blocks, each of which stores data and belongs to one of a plurality of zones and to each of which a physical address is assigned, and wherein the memory block belonging to a predetermined zone is to store data arrangement table, which represents a correspondence between the data and a logical address representing a physical address of a memory block storing the data, and wherein said computer:

includes a first table memory and a second table memory;

creates a first address conversion table, which stores information representing a correspondence between the logical address and a physical address of the memory block storing the data arrangement table, and stores the created first address conversion table in said first table memory;

externally acquires a logical address indicating the data arrangement table, and specifies the physical address of the memory block storing the data arrangement table, based on the first address conversion table and the acquired logical address, in response to an externally-sent instruction, reads the data arrangement table from the memory block which the specified physical address represents, and externally sends the read data arrangement table;

externally acquires a logical address indicating data to be read, and specifies a zone to which a memory block represented by the logical address belongs based on the acquired logical address;

determines whether said second table memory stores a second address conversion table storing information representing a correspondence between the logical address and a physical address of the memory block belonging to the specified zone, and creates the second address conversion table when determined that said second table memory does not store the second address conversion table, and stores the created table in the second table memory; and specifies, as a physical address indicating data to be read, the physical address corresponding to the externally-sent logical address, based on the second address conversion table, and reads out and outputs data stored in a memory block which the specified physical address represents.

21. A computer data signal embodied in a carrier wave and representing a program for making a computer function as a controller which is connected to a memory including a plurality of memory blocks, each of which stores data and belongs to one of a plurality of zones and to each of which a physical address is assigned, and wherein the memory block belonging to a predetermined zone stores a data arrangement table representing a correspondence between the data and a physical address of a memory block storing the data, and wherein said computer:

includes a first table memory and a second table memory;

creates a first address conversion table, which stores information representing a correspondence between the logical address and a physical address of the memory block storing the data arrangement table, and stores the created first address conversion table in said table memory;

externally acquires a logical address indicating the data arrangement table, and specifies a physical address of the memory block storing the data arrangement table, based on the first address conversion table and the acquired logical address, in response to an externally-sent instruction, reads out the data arrangement table from the memory block which the specified physical address represents, and externally sends the read data arrangement table;

externally acquires a logical address indicating data to be read, and specifies a zone to which a memory block represented by the acquired logical address belongs, based on the logical address;

determines whether said second table memory stores a second address conversion table storing information representing a correspondence between the logical address and a physical address of the memory block belonging to the specified zone, and creates the second address conversion table when determined that said second table memory does not store the information, and stores the created table in said second table memory; and specifies, as a physical address indicating data to be read, the physical address corresponding to the externally-acquired logical address, based on the second address conversion table, and reads and outputs data stored in the memory block represented by the specified physical address.

* * * * *